United States Patent
Chen et al.

(10) Patent No.: US 9,894,695 B2
(45) Date of Patent: Feb. 13, 2018

(54) NETWORK ACCESS SYSTEM AND METHOD

(71) Applicant: ZTE Corporation, Shenzhen (CN)

(72) Inventors: Zhongming Chen, Shenzhen (CN); Yada Huang, Shenzhen (CN); Zhongda Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 258 days.

(21) Appl. No.: 14/758,905

(22) PCT Filed: Jul. 24, 2013

(86) PCT No.: PCT/CN2013/079992
§ 371 (c)(1),
(2) Date: Jul. 1, 2015

(87) PCT Pub. No.: WO2013/174335
PCT Pub. Date: Nov. 28, 2013

(65) Prior Publication Data
US 2015/0359019 A1 Dec. 10, 2015

(30) Foreign Application Priority Data
Jan. 18, 2013 (CN) .......................... 2013 1 0027028

(51) Int. Cl.
*H04W 4/00* (2009.01)
*H04W 76/02* (2009.01)
(Continued)

(52) U.S. Cl.
CPC ............ *H04W 76/022* (2013.01); *H04W 8/04* (2013.01); *H04W 36/0033* (2013.01);
(Continued)

(58) Field of Classification Search
CPC .................................................. H04W 76/022
(Continued)

(56) References Cited

U.S. PATENT DOCUMENTS

2010/0260096 A1   10/2010  Ulupinar et al.
2012/0039240 A1*  2/2012   Han ....................... H04B 7/155
                                                                 370/315

FOREIGN PATENT DOCUMENTS

CN    101577931 A    11/2009
CN    101877915 A    11/2010
(Continued)

OTHER PUBLICATIONS

International Search Report for corresponding application PCT/CN2013/079992 filed Jul. 24, 2013; dated Oct. 31, 2013.
Extended European Search Report dated Jan. 19, 2016 re: Application No. PCT/CN2013/079992; pp. 1-9; citing: CN 102 833 802 A, CN 102 883 440 A, WO 2013/185683 A2, CN 102 348 244 A and US 2010/260096 A.

*Primary Examiner* — Shripal Khajuria
(74) *Attorney, Agent, or Firm* — Cantor Colburn LLP

(57) ABSTRACT

Provided are a network access system and method. The system comprises a control plane node which is connected with a UE via a radio interface, connected with an MME via an S1 interface, and configured to process control plane data; and a user plane node, connected with the UE via a radio interface, connected with an SGW via an Ss interface, and configured to process user plane data. It is solved the problem in the related art that a core network is impacted because of frequent information interaction among nodes due to the fact that a user switches among cells, and then achieves the effects of reducing the information interaction among the nodes and reducing the impact on a core network signalling.

18 Claims, 25 Drawing Sheets

(51) Int. Cl.
      *H04W 84/04*     (2009.01)
      *H04W 92/20*     (2009.01)
      *H04W 8/04*     (2009.01)
      *H04W 36/00*     (2009.01)
      *H04W 36/04*     (2009.01)
      *H04W 92/04*     (2009.01)

(52) U.S. Cl.
      CPC ........ *H04W 36/0055* (2013.01); *H04W 36/04* (2013.01); *H04W 84/042* (2013.01); *H04W 84/045* (2013.01); *H04W 92/04* (2013.01); *H04W 92/20* (2013.01)

(58) Field of Classification Search
      USPC .......................................................... 370/329
      See application file for complete search history.

(56) References Cited

FOREIGN PATENT DOCUMENTS

| | | | |
|---|---|---|---|
| CN | 102075859 | A | 5/2011 |
| CN | 102316602 | A | 1/2012 |
| CN | 102348244 | A | 2/2012 |
| CN | 102833802 | A | 12/2012 |
| CN | 102883440 | A | 1/2013 |
| WO | 2013185683 | A2 | 12/2013 |

\* cited by examiner

NETWORK ACCESS SYSTEM AND METHOD

TECHNICAL FIELD

The disclosure relates to the field of communications, including e.g., a network access system and method.

BACKGROUND

FIG. 1 is an overall architecture diagram of a Long Term Evolution (LTE) system in the related art, as shown in FIG. 1, and the architecture comprises a Mobility Management Entity (MME) and a Serving GetWay (SGW). A UU interface is between User Equipment (UE) (or called a terminal) and a eNodeB (eNB), an S1-MME interface is between the eNB and the MME, an S1-U interface is between the eNB and the SGW, and an X2 interface is between the eNBs. FIG. 2 is a schematic diagram of a protocol architecture of a control plane and a user plane among the UE and the eNB and a core network (MME and SGW), at the left side of FIG. 2, interfaces between the UE and the eNB in the LTE are divided into the following several protocol layers from bottom to top: a Physical (PHY) layer, a Media Access Control (MAC) layer, a Radio Link Control (RLC) layer, a Packet Data Convergence Protocol (PDCP) layer and a Radio Resource Control (RRC) layer. At the right side of FIG. 2, the user plane protocol stack of the interface between the UE and the eNB in the LTE are divided into the following several protocol layers from bottom to top: the PHY, the MAC, the RLC and the PDCP. The PHY layer transmits information to the MAC or a higher layer mainly by a transmission channel; the MAC layer provides data transmission and is responsible for radio resource allocation mainly by a logical channel, so as to complete functions such as Hybrid Automatic Repeat Request (HARQ), Scheduling (SCH) and priority processing and Multiplexing (MUX) and De-multiplexing; the RLC layer mainly provides services for sectioning and retransmitting user plane data and control plane data; the PDCP layer is mainly provided for transmitting the user plane data to the RRC layer or an upper layer of the user plane, and the RRC layer mainly completes at least one of the following operations: Broadcast, Paging, wireless resource control connection management, radio bearer control, mobile function and terminal measurement reporting and control.

In order to provide a higher rate data for a mobile subscriber, a Carrier Aggregation (CA) technique is proposed in the Long Term Evolution Advance (LTE-A) system, of which the purpose is to provide a larger broadband for UE with a corresponding capacity so as to improve the peak rate of the UE. In the LTE, the maximum downlink transmission bandwidth supported by the system is 20 MHz, after entering a connected state, the UE may communicate with a network side through a cell. The carrier aggregation technique is a technique in which two or more Component Carriers (CC) are aggregated to support a transmission bandwidth which is larger than 20 MHz and is not larger than 100 MHz. Through the carrier aggregation technique, the UE with a corresponding capacity may receive and send dada on a plurality of cells under the same base station at the same time. The differences of the interface protocol stack between the UE and the base station is mainly reflected on the MAC layer and PHY layer. The PHY layer is specialized for the CC, which is different from the MAC layer, in the MAC layer, the HARQ is specialized for the CC, and the scheduling, the priority processing and multiplexing and de-multiplexing are public for the CC.

Due to lack of spectrum resources and the sharp increase of mass flow service of mobile subscribers, the requirement of using a high frequency point, such as 3.5 GHz, for hot-point covering is increasingly obvious. A node with low power becomes a new application scenario, so as to increase the user throughput and enhance the mobile performance. However, because a signal with a high frequency point attenuates strongly, the coverage area of a new cell is relatively small, moreover, the new cell does not share the same station with the existing cell, when a user moves among these new cells or moves between the new cell and the existing cell, it will certainly lead to a frequent switching process, so that user information is frequently transferred among base stations, thus leading to a great signalling impact to the core network.

SUMMARY

A network access system and method are provided in the embodiment of the disclosure, so as to at least solve the problem in the related art that a user switches among cells, thus resulting in the frequent information interaction among nodes, and impact to the core network.

According to an aspect of the disclosure, a network access system, comprising: a control plane node, connected with a User Equipment (UE) by a radio interface, connected with a Mobile Management Entity (MME) by an S1 interface, and configured to process control plane data; and a user plane node, connected with the UE by a radio interface, connected with a Serving Gateway (SGW) by an Ss interface, and configured to process user plane data.

In an example embodiment, the system further comprises: an Xu interface, connected between the control plane node and the user plane node and configured to enable the control plane node to forward the control plane data to the UE by the user plane node.

In an example embodiment, the system further comprises: a user plane gateway, connected with the user plane node by an Xg interface, connected with the SGW by an S3 interface, and configured to forward the user plane data.

In an example embodiment, the user plane gateway is further configured to execute at least one of the following processing: establishing a signalling connection of an Xc interface between the control plane node and the user plane gateway; establishing a signalling connection of the Xg interface between the user plane node and the user plane gateway; executing operations for establishing, deleting and/or modifying a General Packet Radio Service (GPRS) Tunnelling Protocol-User Plane (GTP-U) channel between the user plane node and the user plane gateway; and controlling operations for establishing, deleting, and/or modifying a GTP-U channel between the user plane gateway and the SGW.

In an example embodiment, the system further comprises: an Xc interface, connected between the control plane node and the user plane gateway, configured to enable the control plane node to control operations for establishing, deleting and/or modifying a channel between the user plane gateway and the SGW; and/or configured to enable the control plane node to control operations for establishing, deleting and/or modifying a channel between the user plane gateway and the user plane node.

In an example embodiment, the control plane node is further configured to execute at least one of the following processing: establishing a signalling connection of an Xu interface between the control plane node and the user plane node; establishing a signalling connection of an Xc interface between the control plane node and the user plane gateway; controlling operations for establishing, deleting and/or modifying a General Packet Radio Service (GPRS) Tunnelling Protocol-User Plane (GTP-U) channel between the user plane node and the user plane gateway; controlling operations for establishing, deleting and/or modifying a GTP-U channel between the user plane gateway and the SGW; and controlling operations for establishing, deleting and/or modifying the radio interface between the user plane node and the UE.

In an example embodiment, the user plane node is further configured to execute at least one of the following processing: establishing a signalling connection of an Xu interface between the control plane node and the user plane node; establishing a signalling connection of an Xg interface between the user plane node and a user plane gateway; when there is a user plane gateway, executing operations for establishing, deleting and/or modifying a General Packet Radio Service (GPRS) Tunnelling Protocol-User Plane (GTP-U) channel between the user plane node and the user plane gateway; when there is no user plane gateway, executing operations for establishing, deleting and/or modifying a General Packet Radio Service (GPRS) Tunnelling Protocol-User Plane (GTP-U) channel between the user plane node and the SGW; and forwarding the control plane data transmitted between the control plane node and the UE.

According to an embodiment of the disclosure, a network access method, comprising: establishing a control plane link for a control plane node to process control plane data which is used for a User Equipment (UE) to access to a network, wherein the control plane link comprises a connection between the control plane node and the UE by a radio interface and a connection between the control plane node and a Mobile Management Entity (MME) by an S1 interface; establishing one or more user plane links for one or more user plane nodes to process user plane data which are used for the UE to access to the network, wherein the one or more user plane links comprise one or more connections between the one or more user plane nodes and the UE by one or more radio interfaces and one or more connections between the one or more user plane nodes and a Serving Gateway (SGW) by one or more Ss interfaces; processing the control plane data according to the control plane link; and processing the user plane data according to the one or more user plane links.

In an example embodiment, establishing the control plane link for the control plane node to process the control plane data which is used for the UE to access to the network comprises: establishing one or more Xu interfaces between the control plane node connected with the MME and the one or more user plane nodes connected with the UE, wherein the one or more Xu interfaces are used to forward the control plane data.

In an example embodiment, when there are one or more user plane gateways for forwarding the user plane data between the SGW and the one or more user plane nodes connected with the UE, establishing the one or more user plane links for the one or more user plane nodes to process the user plane data which is used for the UE to access to the network comprises: establishing one or more Xc interfaces between the control plane node and the one or more user plane gateways, wherein the one or more Xc interfaces are used for the control plane node to control to forward the user plane data by the one or more user plane gateways, and/or establishing one or more Xg interfaces between the one or more user plane nodes and the one or more user plane gateways, wherein the one or more Xg interfaces are used for forwarding the user plane data.

In an example embodiment, processing the control plane data according to the control plane link comprises: processing from the user plane node to the control plane node, which comprises at least one of the following: reporting a problem in a process of the UE conducting random access and reporting that the number of times of transmitting data by a Radio Link Control (RLC) reaches a threshold for the number of times; and processing from the control plane node to the user plane node, which comprises at least one of the following: transferring data, parameter configuration, parameter reconfiguration, Medium Access Control (MAC) layer restoration, link establishment between a RLC and a Packet Data Convergence Layer (PDCP) entity, link release between the RLC and the PDCP entity, reestablishment between the RLC and the PDCP entity, verifying consistence protection and integrity algorithm, reporting a bottom layer synchronization state and reporting a cell deactivation state.

According to other aspect of the disclosure, a network access system, comprising: a first establishing component, configured to establish a control plane link for a control plane node to process control plane data which is used for a User Equipment (UE) to access to a network, wherein the control plane link comprises a connection between the control plane node and the UE by a radio interface and a connection between the control plane node and a Mobile Management Entity (MME) by an S1 interface; a second establishing component, configured to establish one or more user plane links for one or more user plane nodes to process user plane data which is used for the UE to access to the network, wherein the one or more user plane links comprise one or more connections between the one or more user plane nodes and the UE by one or more radio interfaces and one or more connections between the one or more user plane nodes and a Serving Gateway (SGW) by one or more Ss interfaces; a first processing component, configured to process the control plane data according to the control plane link; and a second processing component, configured to process the user plane data according to the one or more user plane links.

In an example embodiment, the first establishing component comprises: a first establishing element, configured to establish one or more Xu interfaces between the control plane node connected with the MME and the one or more user plane nodes connected with the UE, wherein the one or more Xu interfaces are used to forward the control plane data.

In an example embodiment, the second establishing component comprises: a second establishing element, configured to establish one or more Xc interfaces between the control plane node and the one or more user plane gateways, wherein the one or more Xc interfaces are used for the control plane node to control to forward the user plane data by the one or more user plane gateways, and/or a third establishing element, configured to establish one or more Xg interfaces between the one or more user plane nodes and the one or more user plane gateways, wherein the one or more Xg interfaces are used for forwarding the user plane data.

In an example embodiment, the first processing component is configured to conduct the following processing: processing from the user plane node to the control plane node comprises at least one of the following: reporting a problem in a process of the UE conducting random access and reporting that the number of times of transmitting data by a Radio Link Control (RLC) reaches a threshold for the number of times; and processing from the control plane node to the user plane node comprises at least one of the following: transferring data, parameter configuration, parameter reconfiguration, Medium Access Control, MAC layer restoration, link establishment between a RLC and a Packet Data Convergence Layer (PDCP) entity, link release between the RLC and the PDCP entity, reestablishment between the RLC and the PDCP entity, verifying consistence protection and integrity algorithm, reporting a bottom layer synchronization state and reporting a cell deactivation state.

According to another aspect of the disclosure, a network access system, comprising: a macro cell, connected with a User Equipment (UE) by a radio interface, connected with a core network by an S1 interface, connected to one or more small cells by one or more Xx interfaces, and configured to process control plane data which are used for the UE to access to the Xx interface and the radio interface of the core network through the one or more small cells; and the one or more small cells, connected with the UE by a radio interface, connected with the core network by an S2 interface, connected with the macro cell by the Xx interface, and configured to process control plane data and user plane data which are used for the UE to access to the Xx interface and the S2 interface of the core network through the one or more small cells.

In an example embodiment, the system further comprises: a small cell gateway, connected with the core network and the small cell by the S2 interface, and configured to control a General Packet Radio Service (GPRS) Tunnelling Protocol-User Plane (GTP-U) channel between the core network and the small cell.

According to another aspect of the disclosure, a network access method, comprising: establishing one or more control plane links used for processing control plane data which are used for a User Equipment (UE) to access to a core network through one or more small cells, wherein the one or more control plane links comprise a connection between a macro cell and the UE by a radio interface, one or more connections between the macro cell and the one or more small cells by one or more Xx interfaces, and one or more connections between the one or more small cells and the core network by one or more S2 interfaces; establishing one or more user plane links used for processing user plane data which are used for the UE to access to the core network through the one or more small cells, wherein the one or more user plane links comprise one or more connections between the one or more small cells and the UE by one or more radio interfaces, one or more connections between the one or more small cells and the core network by one or more S2 interfaces, and one or more connections between the one or more small cells and the macro cell by one or more Xx interfaces; processing the control plane data according to the one or more control plane links; and processing the user plane data according to the one or more user plane links.

In an example embodiment, establishing the one or more S2 interfaces between the one or more small cells and the core network, which are the one or more user plane links for processing user plane data which are used for the UE to access to the core network through the one or more small cells comprises: establishing a General Packet Radio Service (GPRS) Tunnelling Protocol-User Plane (GTP-U) channel between the core network and a small cell gateway; and establishing one or more GTP-U channels between the small cell gateway and the one or more small cells.

In an example embodiment, processing the control plane data according to the one or more control plane links comprises at least one of the following: establishing one or more signalling connections of Xx interfaces between the macro cell and the one or more small cells; controlling operations for establishing, deleting, and/or modifying General Packet Radio Service (GPRS) Tunnelling Protocol-User Plane (GTP-U) channels between the one or more small cells and the core network; establishing radio bearers between the UE and the one or more small cells; and processing IP data packet forwarding between the macro cell and the one or more small cells through one or more Xx interfaces.

In an example embodiment, processing the user plane data according to the one or more user plane links comprises: maintaining a General Packet Radio Service (GPRS) Tunnelling Protocol-User Plane (GTP-U) channel between a small cell gateway and the core network; and processing the user plane data according to the maintained GTP-U channel.

According to the other aspect of the disclosure, a network access system, comprising: a third establishing component, configured to establish one or more control plane links used for processing control plane data which are used for a User Equipment (UE) to access to a core network through one or more small cells, wherein the one or more control plane links comprise a connection between a macro cell and the UE by a radio interface, a connection between the macro cell and the core network by an S1 interface, one or more connections between the macro cell and the one or more small cells by one or more Xx interfaces, and one or more connections between the one or more small cells and the core network by one or more S2 interfaces; a fourth establishing component, configured to establish one or more user plane links used for processing user plane data which are used for the UE to access to the core network through the one or more small cells, wherein the one or more user plane links comprise one or more connections between the one or more small cells and the UE by one or more radio interfaces, one or more connections between the one or more small cells and the core network by one or more S2 interfaces, and one or more connections between the one or more small cells and the macro cell by one or more Xx interfaces; a third processing component, configured to process the control plane data according to the one or more control plane links; and a fourth processing component, configured to process the user plane data according to the one or more user plane links.

In an example embodiment, the fourth establishing component comprises: a fourth establishing element, configured to establish a user plane General Packet Radio Service (GPRS) Tunnelling Protocol-User Plane (GTP-U) channel between the core network and a small cell gateway; and a fifth establishing element, configured to establish one or more user plane GTP-U channels between the small cell gateway and the one or more small cells.

In an example embodiment, the third processing component is configured to conduct at least one of the following processing: establishing one or more signalling connections of Xx interfaces between the macro cell and the one or more small cells; controlling operations for establishing, deleting, and/or modifying General Packet Radio Service (GPRS) Tunnelling Protocol-User Plane (GTP-U) channels between the one or more small cells and the core network; establishing radio bearers between the UE and the one or more small cells; and processing IP data packet forwarding between the macro cell and the one or more small cells through one or more Xx interfaces.

In an example embodiment, the fourth processing component comprises: a maintaining component, configured to maintain a user plane General Packet Radio Service (GPRS) Tunnelling Protocol-User Plane (GTP-U) channel between a small cell gateway and the core network; and a processing component, configured to process the user plane data according to the maintained GTP-U channel.

Through the embodiment of the disclosure, a control plane node, connected with a UE by a radio interface, connected with an MME by an S1 interface and configured to process control plane data and a user plane node, connected with the UE by a radio interface, connected with an SGW by an Ss interface, and configured to process user plane data. It is solved the problem in the related art that a user switches among cells, thus resulting in the frequent information interaction among nodes, and impact to the core network, and then it is achieved the effects of reducing the information interaction among the nodes and reducing the signalling impact on the core network.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
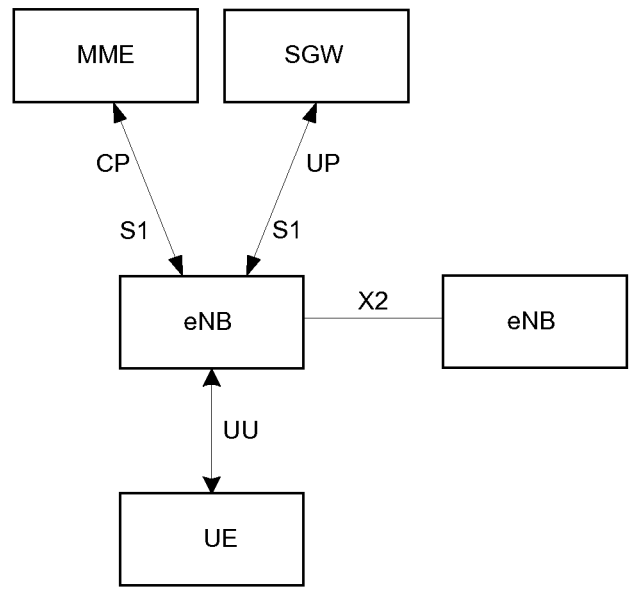
FIG. 1 is an overall architecture diagram of a long term evolution system in the related art.
Figure 2:
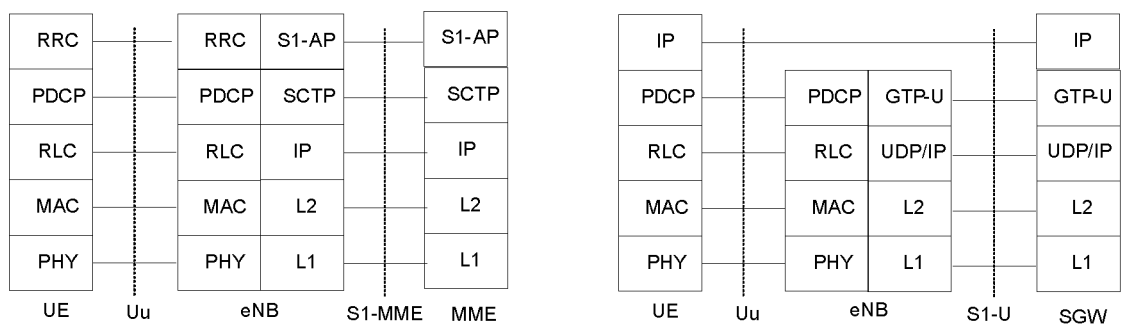
FIG. 2 is a schematic diagram of a protocol architecture of a control plane and a user plane among the UE, the eNB and a core network (MME and SGW) of the LTE in the related art.
Figure 3:
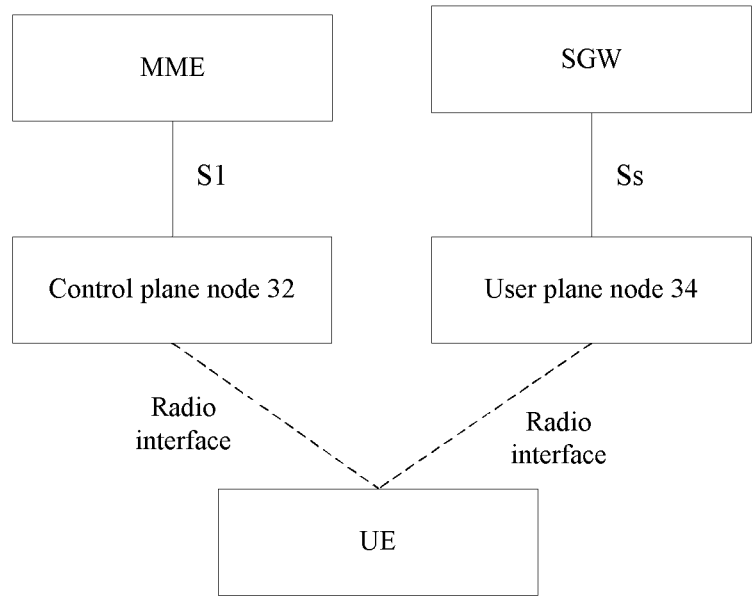
FIG. 3 is a structural block diagram I of a network access system according to an embodiment of the disclosure.

A network access system is provided in an embodiment of the disclosure, FIG. 3 is a structural block diagram I of a network access system according to an embodiment of the disclosure, as shown in FIG. 3, the structure comprises a control plane node 32 and a user plane node 33, and the structure is described below.

The control plane node 32 is connected to terminal UE by a radio interface, connected with a mobile management entity (MME) by an S1 interface and configured to process control plane data.

The user plane node 34 is connected with the UE through a radio interface, connected to a serving gateway (SGW) by an Ss interface and configured to process user plane data.

In the above system architecture, the control plane and the user plane are separated in the processing process that UE accesses to the network core, compared with the related art of moving among new cells or moving between the new cell and the existing cell, which certainly lead to a frequent switching process, so that user information is frequently transferred among base stations, thus leading to a great signalling impact to the core network, by using the above technique solution of separating the control plane node for processing the control plane dada from the user plane node for processing the user plane dada, frequent and repeated operations are not needed during processing the control plane data when the UE switched between different cells; therefore, the information interaction among nodes is reduced, and signalling impact to the core network is reduced to some extent.

Figure 4:
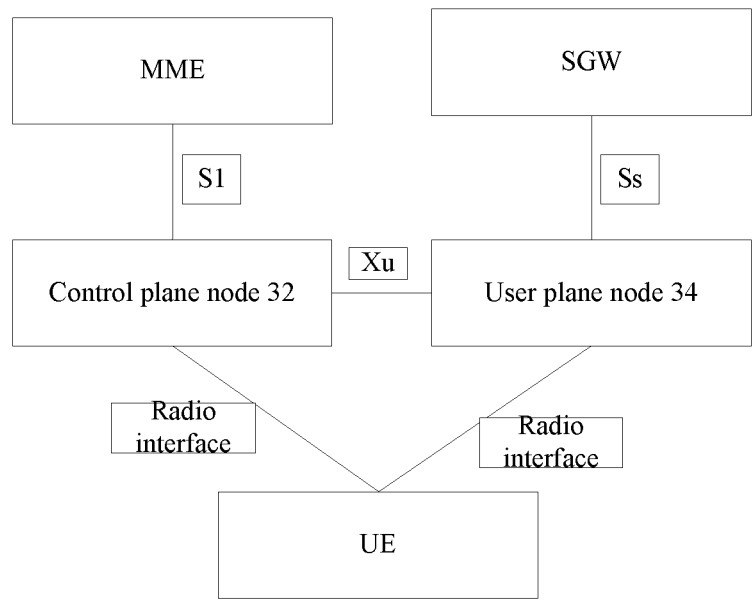
FIG. 4 is an example structural block diagram I of a network access system according to an embodiment of the disclosure.

FIG. 4 is an example structural block diagram I of a network access system according to an embodiment of the disclosure, as shown in FIG. 4, the structure further comprises an Xu interface besides including all the structures of FIG. 3, the Xu interface is connected between the control plane node and the user plane node and is configured to enable the control plane node to forward control plane data to UE by the user plane node.

Figure 5:
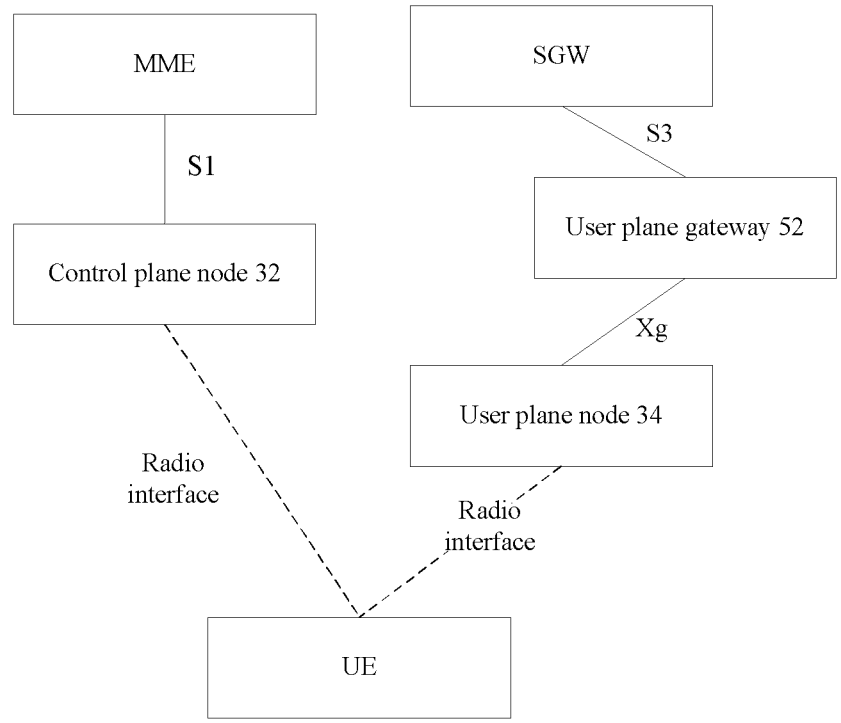
FIG. 5 is an example structural block diagram I of a network access system according to an embodiment of the disclosure.

FIG. 5 is an example structural block diagram I of a network access system according to an embodiment of the disclosure, as shown in FIG. 5, besides including all the structures of FIG. 3, the structure further comprises a user plane gateway 52 which is connected to the user plane node by an Xg interface, connected with the SGW by an S3 interface and configured to forward the user plane data.

The user plane gateway is further configured to conduct at least one of the following processing: establishing a signalling connection of an Xc interface between the control plane node and the user plane gateway, establishing a signalling connection of an Xg interface between the user plane node and the user plane gateway; executing operations for establishing, deleting and/or modifying a General Packet Radio Service (GPRS) Tunnelling Protocol-User Plane (GTP-U) channel between the user plane node and the user plane gateway; and controlling operations for establishing, deleting, and/or modifying a GTP-U channel between the user plane gateway and the SGW.

Figure 6:
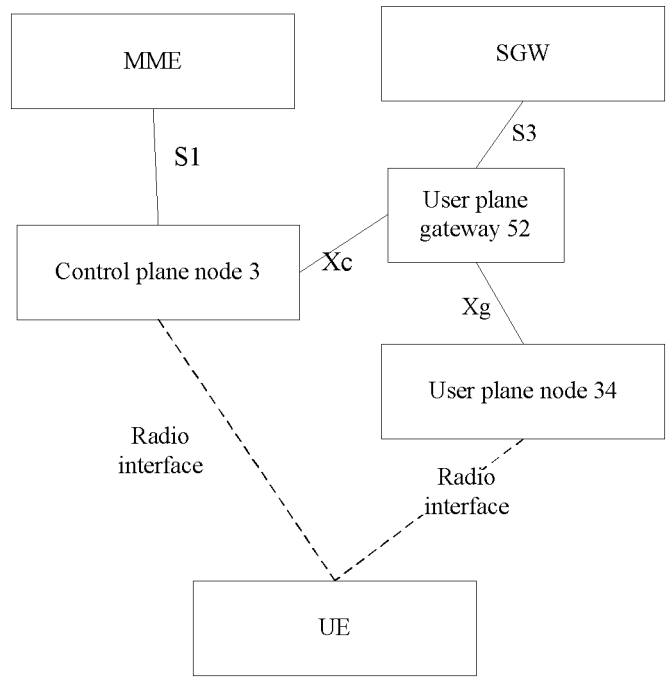
FIG. 6 is an example structural block diagram I of a network access system according to an embodiment of the disclosure.

FIG. 6 is an example structural block diagram I of a network access system according to an embodiment of the disclosure, as shown in FIG. 6, besides including all the structures of FIG. 3, the structure further comprises an Xc interface which is connected between the control plane node and the user plane gateway, is configured to enable the control plane node to control operations for establishing, deleting and/or modifying a channel between the user plane gateway and the SGW; and/or configured to enable the control plane node to control operations for establishing, deleting and/or modifying a channel between the user plane gateway and the user plane node.

The control plane node is further configured to execute at least one of the following processing: establishing a signalling connection of an Xu interface between the control plane node and the user plane node, establishing a signalling connection of an Xc interface between the control plane node and the user plane gateway, controlling operations for establishing, deleting and/or modifying a General Packet Radio Service (GPRS) Tunnelling Protocol-User Plane (GTP-U) channel between the user plane node and the user plane gateway; controlling operations for establishing, deleting and/or modifying a GTP-U channel between the user plane gateway and the SGW; and controlling operations for establishing, deleting and/or modifying the radio interface between the user plane node and the UE.

The user plane node is configured to execute at least one of the following processing: establishing a signalling connection of an Xu interface between the control plane node and the user plane node; establishing a signalling connection of an Xg interface between the user plane node and the user plane gateway; executing operations for establishing, deleting and/or modifying a General Packet Radio Service (GPRS) Tunnelling Protocol-User Plane (GTP-U) channel between the user plane node and the user plane gateway in the case where there is a user plane gateway; in the case where there is no user plane gateway, executing operations for establishing, deleting and/or modifying a General Packet Radio Service (GPRS) Tunnelling Protocol-User Plane (GTP-U) channel between the user plane node and the SGW; and forwarding the control plane data transmitted between the control plane node and the UE.

Figure 7:
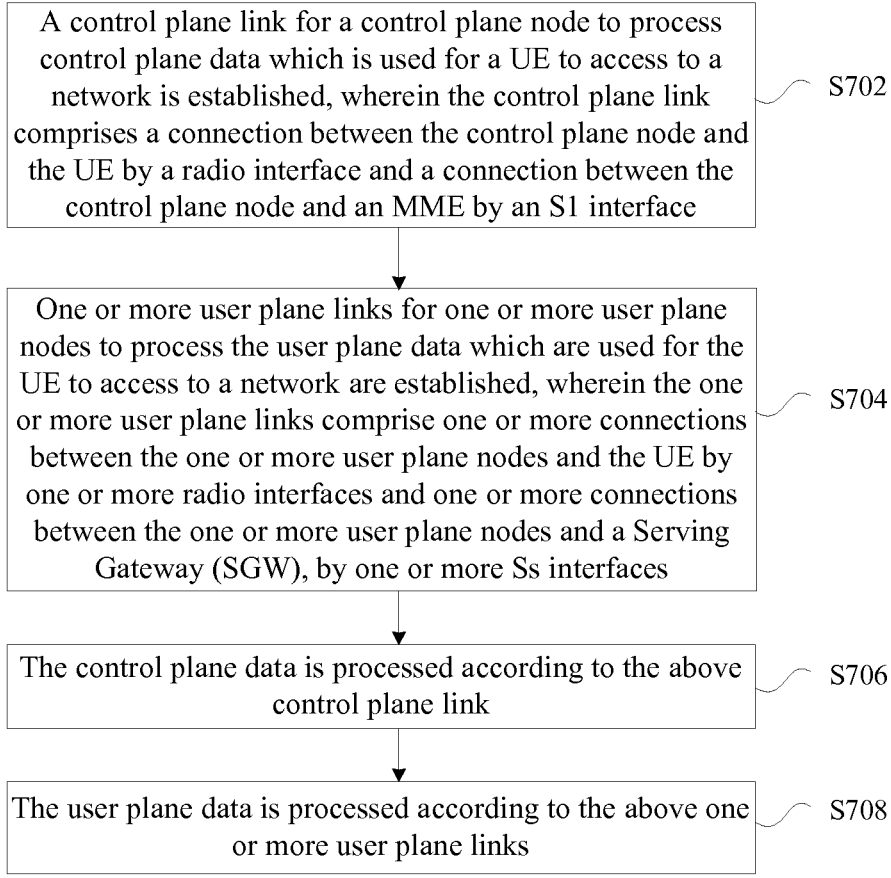
FIG. 7 is a flowchart of a network access method according to an embodiment of the disclosure.

A network access method is provided in this embodiment, FIG. 7 is a flowchart of a network access method according to an embodiment of the disclosure, as shown in FIG. 7, and the flowchart comprises the following steps.

Step S702, a control plane link for a control plane node to process control plane data which is used for a UE to access to a network is established, wherein the control plane link comprises a connection between the control plane node and the UE by a radio interface and a connection between the control plane node and an MME by an S1 interface.

Step S704, one or more user plane links for one or more user plane nodes to process the user plane data which are used for the UE to access to a network are established, wherein the one or more user plane links comprise one or more connections between the one or more user plane nodes and the UE by one or more radio interfaces and one or more connections between the one or more user plane nodes and a Serving Gateway (SGW), by one or more Ss interfaces.

Step S706, the control plane data is processed according to the above control plane link.

Step S708, the user plane data is processed according to the above one or more user plane links.

By means of the above steps, the user plane is separated from the control plane, and then a corresponding control plane link and a corresponding user plane link are established, the control plane data is processed by the established control plane link, and the user plane data is processed by the established user plane link. By means of using the above technique solution of separating the control plane node for processing the control plane dada and the user plane node for processing the user plane dada, frequent and repeated operations are not needed during processing the control plane data when the UE switched between different cells; therefore, the information interaction among nodes is reduced, and signalling impact to the core network is reduced to some extent.

In an optional manner, establishing the control plane link for the control plane node to process control plane data which is used for the UE to access to the network comprises that: establishing one or more Xu interfaces between the control plane node connected with the MME and one or more user plane node connected with the UE, wherein the one or more Xu interfaces are used to forward the control plane data.

When there are one or more user plane gateways for forwarding the user plane data between the SGW and the one or more user plane nodes connected with the UE, establishing the one or more user plane links for the one or more user plane nodes to process the user plane data which is used for the UE to access to the network comprises: establishing one or more Xc interfaces between the control plane node and the one or more user plane gateways, wherein the one or more Xc interfaces are used for the control plane node to control to forwarded the user plane data by the one or more user plane gateways, and/or establishing one or more Xg interfaces between the one or more user plane nodes and the one or more user plane gateways, wherein the one or more Xg interfaces are used for forwarding the user plane data.

Processing the control plane data according to the control plane link comprises: the processing from the control plane node to the user plane node, which comprise at least one of the following: reporting a problem in the process of the UE conducting random access and reporting that the number of times of transmitting data by a Radio Link Control (RLC) reaches a threshold for the number of times; and the processing from the control plane node to the user plane node, which comprise at least one of the following: transferring data, parameter configuration, parameter reconfiguration, medium access control (MAC) layer restoration, link establishment between the RLC and the PDCP entity, link release between the RLC and the PDCP entity, reestablishment between the RLC and the PDCP entity, verifying consistence protection and integrity algorithm, reporting a bottom layer synchronization state and reporting a cell deactivation state.

Figure 8:
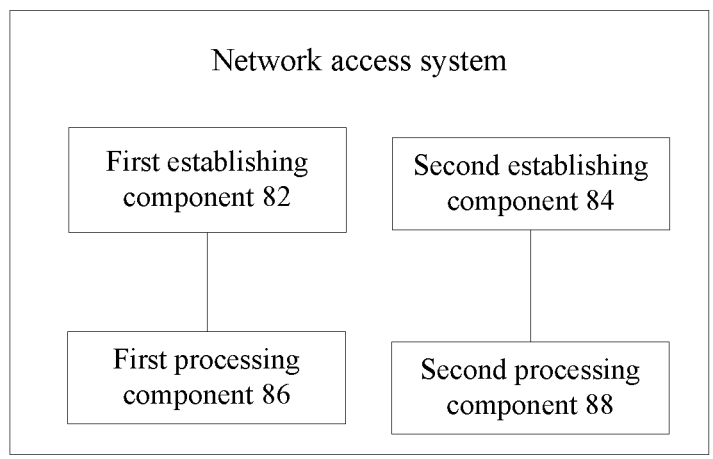
FIG. 8 is a structural block diagram II of a network access system according to an embodiment of the disclosure.

A network access system is further provided in this embodiment, FIG. 8 is a structural block diagram II of a network access system according to an embodiment of the disclosure, as shown in FIG. 8, the system comprises a first establishing component 82, a second establishing component 84, a first processing component 86 and a second processing component 88, and the system is described below.

The first establishing component 82 is configured to establish a control plane link for a control plane node to process control plane data which is used for a UE to access to a network, wherein the control plane link comprises a connection between the control plane node and the UE by a radio interface and a connection between the control plane node and an MME by an S1 interface; the second establishing component 84 is configured to establish one or more user plane links for one or more user plane nodes to process the user plane data which is used for the UE to access to a network, wherein the one or more user plane links comprise one or more connections between the one or more user plane nodes and the UE by one or more radio interfaces and one or more connections between the one or more user plane nodes and a Serving Gateway (SGW) by one or more Ss interfaces; the first processing component 86 is connected to the first establishing component 82 and is configured to process the control plane data according to the control plane link; and the second processing component 88 is connected to the above second establishing component 84 and is configured to process the user plane data according to the one or more user plane links.

Figure 9:
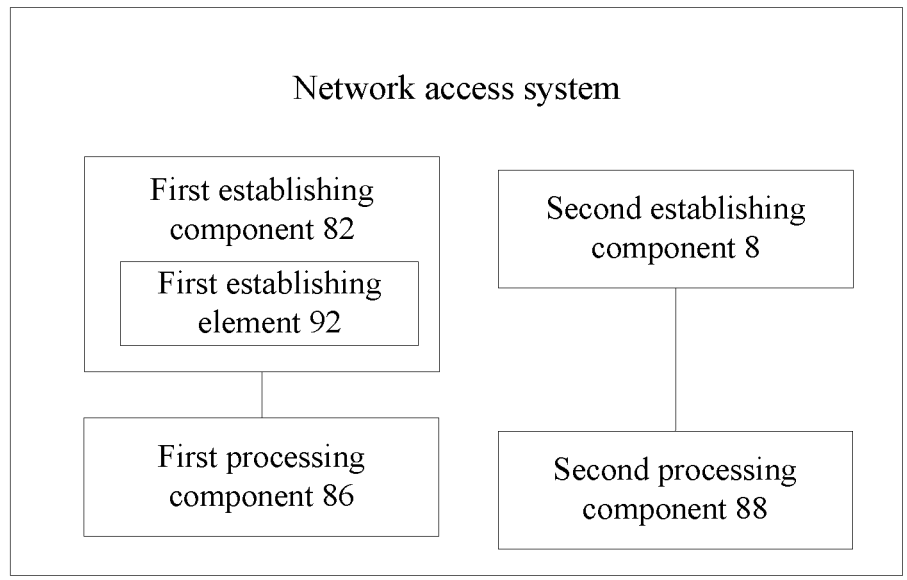
FIG. 9 is an example structural block diagram II of a first establishing component 82 of a network access system according to an embodiment of the disclosure.

FIG. 9 is an example structural block diagram II of a first establishing component 82 of a network access system according to an embodiment of the disclosure, as shown in FIG. 9, the first establishing component 82 comprises a first establishing element 92, the first establishing element 92 is configured to establish one or more Xu interfaces between the control plane node connected with the MME and the one or more user plane nodes connected with the UE, wherein the one or more Xu interfaces are used to forward the control plane data.

Figure 10:
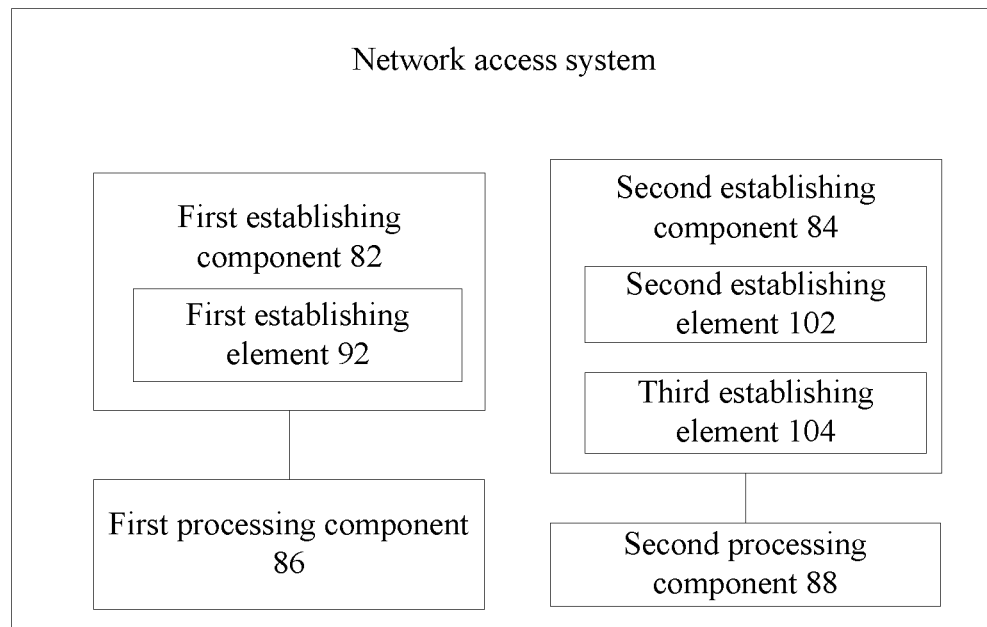
FIG. 10 is an example structural block diagram II of a second establishing component 84 of a network access system according to an embodiment of the disclosure.

FIG. 10 is an example structural block diagram II of a second establishing component 84 of a network access system according to an embodiment of the disclosure, as shown in FIG. 10, the second establishing component 82 comprises a second establishing element 102 and/or a third establishing element 104, and the example system structure is described below. The second establishing element 102 is configured to establish one or more Xc interfaces between the control plane node and the one or more user plane gateways, wherein the one or more Xc interfaces are used for the control plane node to control to forward the user plane data by the one or more user plane gateways, and/or the third establishing element 104 is configured to establish one or more Xg interfaces between the one or more user plane nodes and one or more user plane gateways, wherein the one or more Xg interfaces are used for forwarding the user plane data.

In an optional manner, the first processing component is configured to perform the following processing: the processing from the user plane node to the control plane node comprises at least one of the following: reporting a problem in the process of the UE conducting random access and reporting that the number of times of transmitting data by an RLC reaches a threshold for the number of times; and the processing from the control plane node to the user plane node comprises at least one of the following: transferring data, parameter configuration, parameter reconfiguration, MAC layer restoration, link establishment between the RLC and the PDCP entity, link release between the RLC and the PDCP entity, reestablishment between the RLC and the PDCP entity, verifying consistence protection and integrity algorithm, reporting a bottom layer synchronization state and reporting a cell deactivation state.

Figure 11:
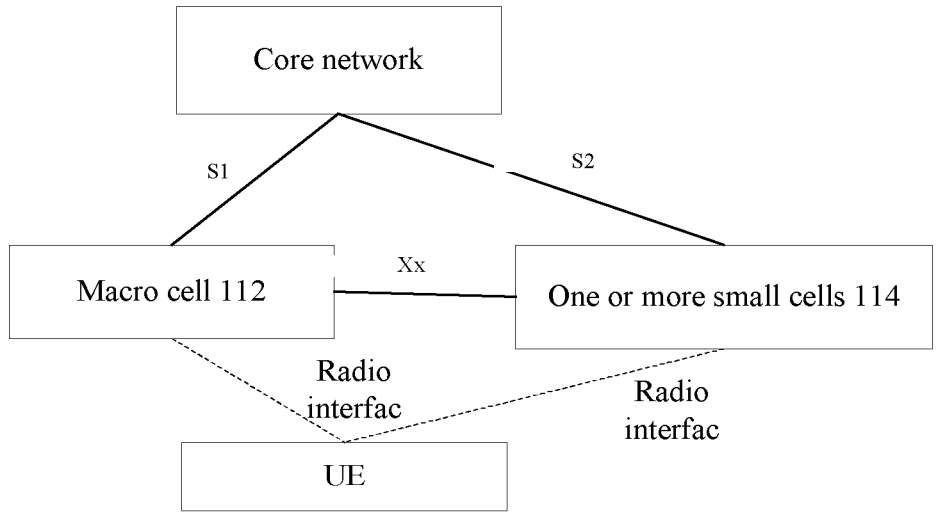
FIG. 11 is a structural block diagram III of a network access system according to an embodiment of the disclosure.

In this embodiment, a network access system is provided in this embodiment, FIG. 11 is a structural block diagram III of a network access system according to an embodiment of the disclosure, as shown in FIG. 11, the system comprises a macro cell 112 and one or more small cells 114, and system is described below. The macro cell 112 is connected with a UE through a radio interface, connected with a core network through an S1 interface, connected to one or more small cells by one or more Xx interfaces, and configured to process the UE control plane data which are used for the UE to access to the Xx interface and the radio interface of the core network through the one or more small cells; and the one or more small cells 114 are connected with the UE through a radio interface, connected with the core network by an S2 interface, connected with the macro cell through an Xx interface, and configured to process control plane data and user plane data which are used for the UE to access to the Xx interface and the S2 interface of the core network through the one or more small cells.

Figure 12:
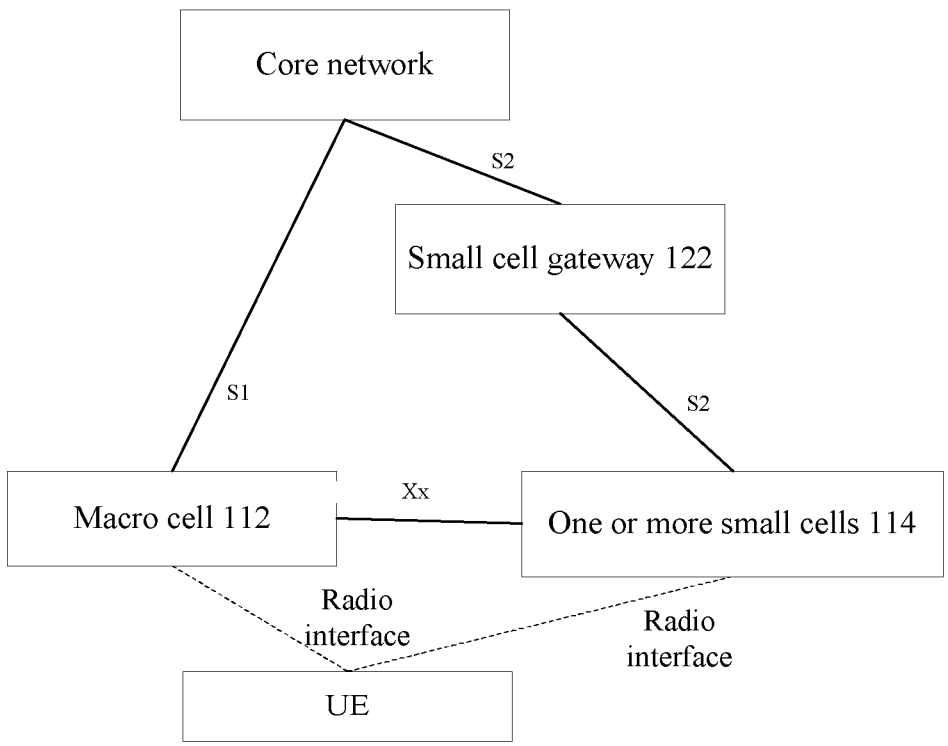
FIG. 12 is an example structural block diagram III of a network access system according to an embodiment of the disclosure.

FIG. 12 is an example structural block diagram III of a network access system according to an embodiment of the disclosure, as shown in FIG. 12, besides including the structure shown in FIG. 11, the system further comprises a small cell gateway 122, and the small cell gateway 122 is connected with the core network and the small cell through the S2 interface and is configured to control a GTP-U channel between the core network and the small cell.

Figure 13:
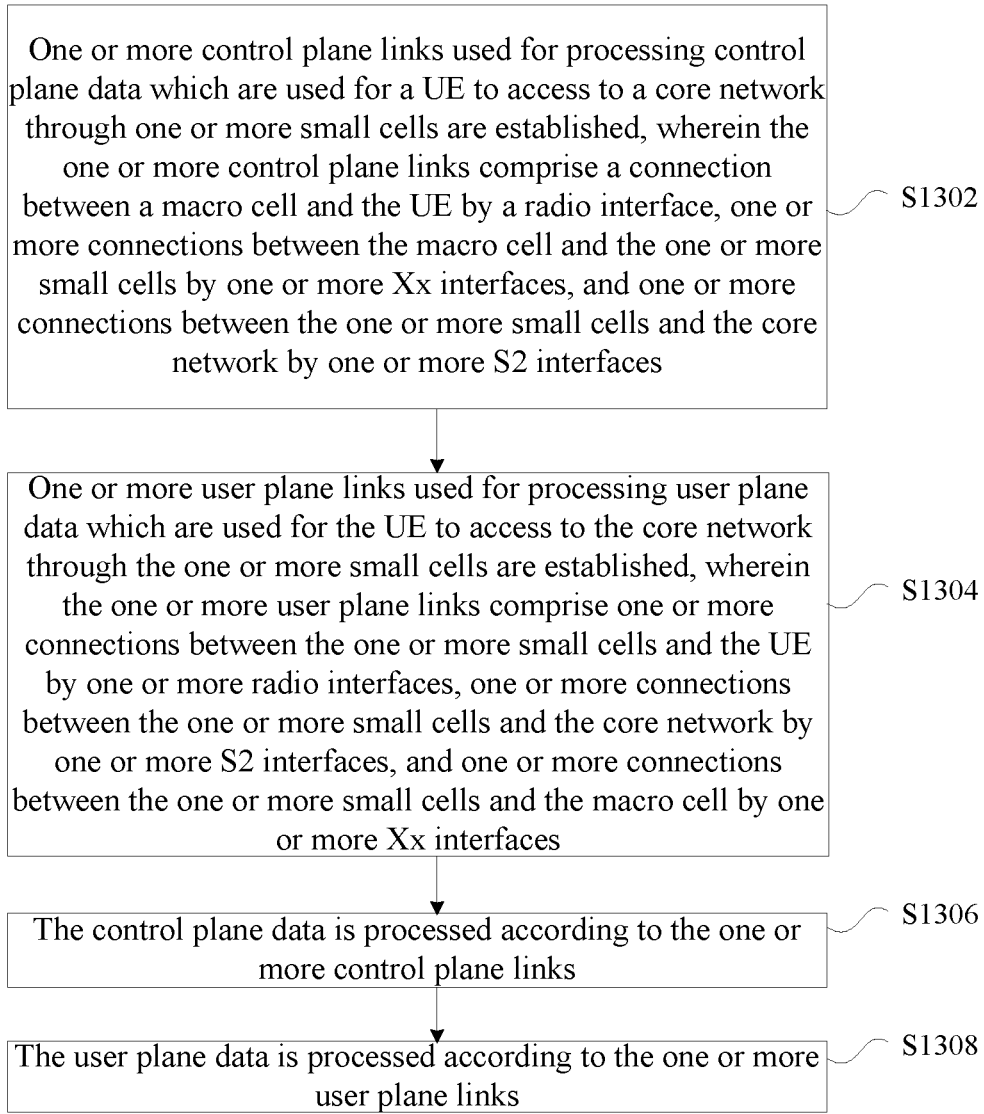
FIG. 13 is a flowchart of a network access method according to an embodiment of the disclosure.

A network access method is further provided in this embodiment, FIG. 13 is a flowchart of a network access method according to an embodiment of the disclosure, as shown in FIG. 13, and the flow comprises the following steps.

Step S1302, one or more control plane links used for processing control plane data which are used for a UE to access to a core network through one or more small cells are established, wherein the one or more control plane links comprise a connection between a macro cell and the UE by a radio interface, one or more connections between the macro cell and the one or more small cells by one or more Xx interfaces, and one or more connections between the one or more small cells and the core network by one or more S2 interfaces.

Step S1304, one or more user plane links used for processing user plane data which are used for the UE to access to the core network through the one or more small cells are established, wherein the one or more user plane links comprise one or more connections between the one or more small cells and the UE by one or more radio interfaces, one or more connections between the one or more small cells and the core network by one or more S2 interfaces, and one or more connections between the one or more small cells and the macro cell by one or more Xx interfaces.

Step S1306, the control plane data is processed according to the one or more control plane links.

Step S1308, the user plane data is processed according to the one or more user plane links.

In an optional manner, establishing the one or more S2 interfaces between the one or more small cells and the core network, which are the one or more user plane links for processing user plane data which are used for the UE to access to the core network through the one or more small cells comprises: a user plane GPRS tunnelling protocol GTP-U channel between the core network and a small cell gateway is established; and one or more user plane GPRS tunnelling protocol GTP-U channels between the small cell gateway and the one or more small cells are established.

In an optional manner, processing the control plane data according to the one or more control plane links comprises at least one of the following: establishing one or more signalling connections of an Xx interface between the macro cell and the one or more small cells; controlling operations for establishing, deleting, and/or modifying General Packet Radio Service (GPRS) Tunnelling Protocol-User Plane (GTP-U) channels between the one or more small cells and the core network; establishing radio bearers between the UE and the one or more small cells; and processing IP data packet forwarding between the macro cell and the one or more small cells through one or more Xx interfaces.

In an optional manner, processing the user plane data according to the one or more user plane links comprises: a user plane GPRS tunnelling protocol GTP-U channel between the small cell gateway and the core network is maintained; and the user plane data according to the maintained GTP-U channel is processed.

Figure 14:
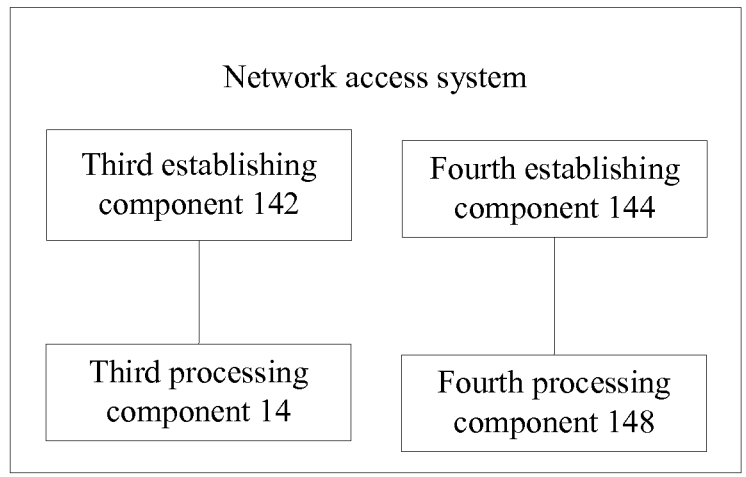
FIG. 14 is a structural block diagram IV of a network access system according to an embodiment of the disclosure.

A network access system is further provided in this embodiment, FIG. 14 is a structural block diagram IV of a network access system according to an embodiment of the disclosure, as shown in FIG. 14, the system comprises a third establishing component 142, a fourth establishing component 144, a third processing component 146 and a fourth processing component 148, and the structure is described below.

The third establishing component 142 is configured to establish one or more control plane links used for processing control plane data which are used for a UE to access to a core network through one or more small cells, wherein the one or more control plane links comprise a connection between a macro cell and the UE by a radio interface, a connection between the macro cell and the core network by an S1 interface, one or more connections between the macro cell and the one or more small cells by one or more Xx interfaces, and one or more connections between the one or more small cells and the core network by one or more S2 interfaces; the fourth establishing component 144 is configured to establish one or more user plane links used for processing user plane data which are used for the UE to access to the core network through one or more small cells, wherein the one or more user plane links comprise one or more connections between the one or more small cells and the UE by one or more radio interfaces, one or more connections between the one or more small cells and the core network by one or more S2 interfaces, and one or more connections between the one or more small cells and the macro cell by one or more Xx interfaces; the third processing component 146 is connected to the above third processing component 143 and is configured to process the control plane data according to the one or more control plane links; and the fourth processing component 148 is connected to the above fourth establishing component 144 and is configured to process the user plane data according to the one or more user plane links.

Figure 15:
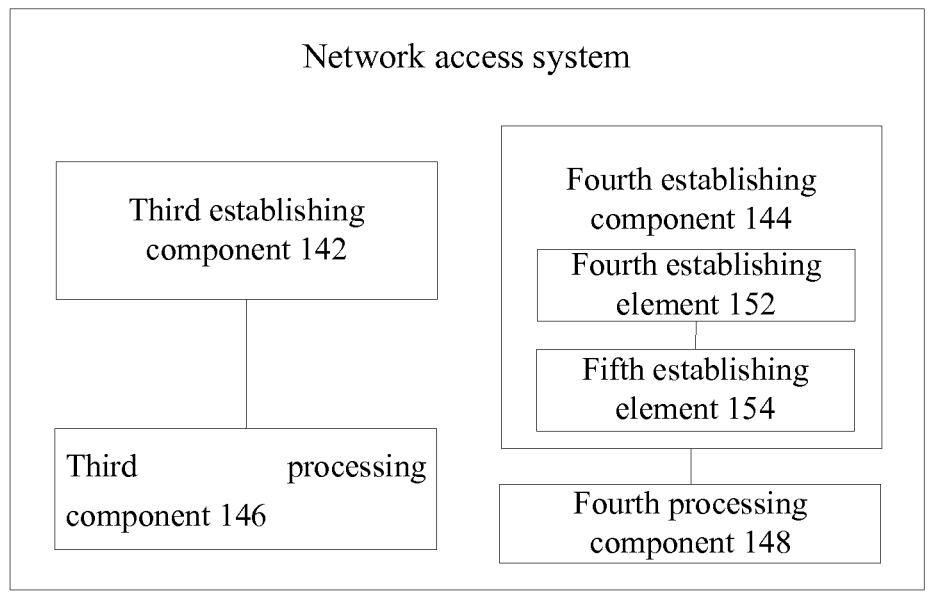
FIG. 15 is an example structural block diagram of a fourth establishing component 144 of a network access system according to an embodiment of the disclosure.

FIG. 15 is an example structural block diagram of a fourth establishing component 144 of a network access system according to an embodiment of the disclosure, as shown in FIG. 15, the fourth establishing component 144 comprises a fourth establishing element 152 and a fifth establishing unit 154, and the fourth establishing component 144 is described below.

The fourth establishing element 152 is configured to establish a user plane GPRS tunnelling protocol GTP-U channel between the core network and the small cell gateway; and the fifth establishing unit 154 is configured to establish one or more user plane GPRS tunnelling protocol GTP-U channels between the small cell gateway and the one or more small cells.

In an optional manner, the third processing component is configured to conduct at least one of the following processing: establishing one or more signalling connections of Xx interfaces between the macro cell and one or more small cells; controlling operations for establishing, deleting, and/or modifying General Packet Radio Service (GPRS) Tunnelling Protocol-User Plane (GTP-U) channels between the one or more small cells and the core network; establishing radio bearers between the UE and the one or more small cells; and processing IP data packet forwarding between the macro cell and the one or more small cells through one or more Xx interfaces.

Figure 16:
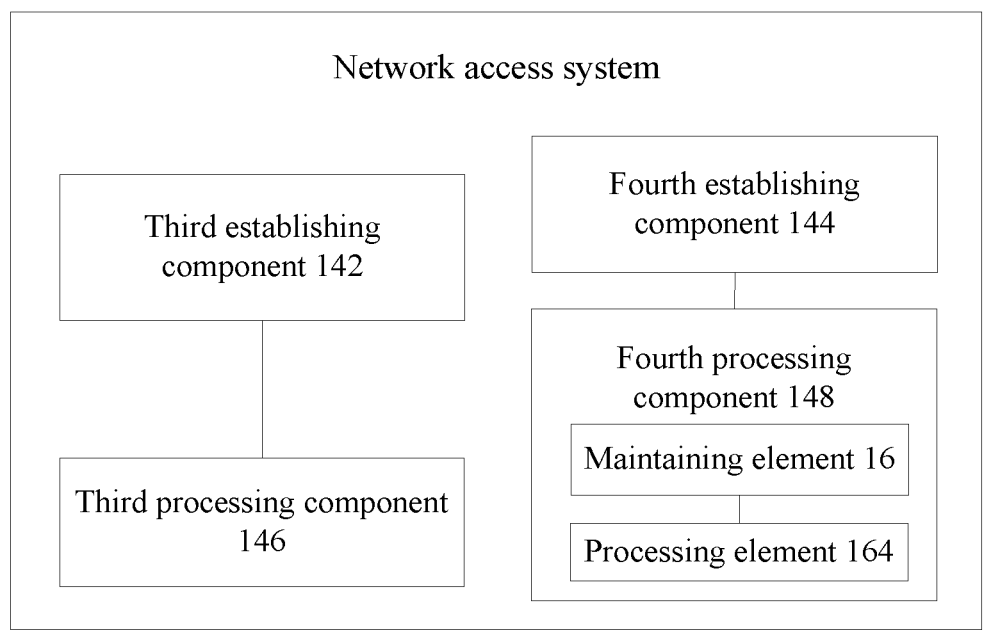
FIG. 16 is an example structural block diagram of a fourth processing component 148 in a network access system according to an embodiment of the disclosure.

FIG. 16 is an example structural block diagram of a fourth processing component 148 in a network access system according to an embodiment of the disclosure, as shown in FIG. 16, the fourth establishing component 148 comprises a maintaining unit 162 and a processing unit 164, and the fourth processing component 148 is described below.

The maintaining unit 162 is configured to maintain a user plane GPRS tunnelling protocol GTP-U channel between the small cell gateway and the core network; and the processing unit 164 is connected to the above maintaining unit 162 and is configured to process the user plane data according to the maintained GTP-U channel.

Figure 18:
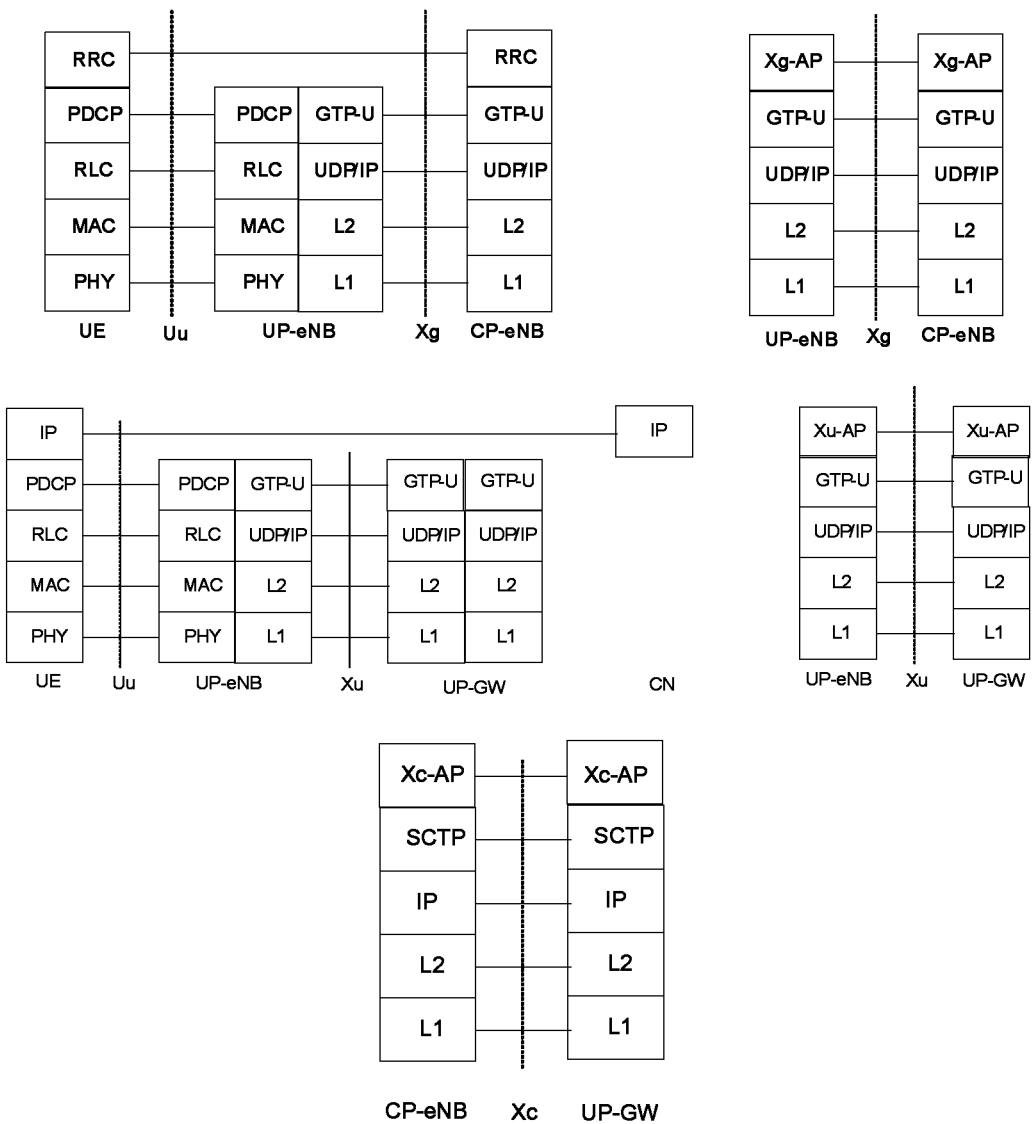
FIG. 18 is a system protocol architecture diagram corresponding to FIGS. 17a and 17b.

In order to reduce the frequency of transferring user information between base stations (e.g., the context of a control plane related to UE), this kind of user information may be controlled within a base station or a cell. When the UE moves near this base station or the cell, these pieces of user information are not required to be transferred. Based on this, the user plane needs to be separated from the control plane, and there are at least the following three new logical nodes:

CP-eNB (i.e., the above control plane node): the nodes for processing the control plane data. Besides supporting the control plane function owned by the base station of the LTE system in the related art, the CP-eNB further needs to support a signalling connection for establishing an Xu interface between the CP-eNB and the UP-eNB, and possibly assists managing the GTP-U channel, including establishment, deletion and modification, between the UP-eNB and the UP-GW or between the UP-eNB and the SGW. The control plane protocol stack and the user plane protocol stack between the CP-eNB and the MME are the same as the protocol stack of the S1 interface in the related art, the user plane protocol stacks of the CP-eNB and the UP-eNB are the same as the user plane protocol stack of the X2 interface, and the control plane protocol stack, as shown in FIG. 18, needs to complete the function of an Xg-AP protocol layer and is mainly used for managing the establishment of the channel of the bottom layer GTP-U. In addition, the function of the RRC protocol layer further needs to be completed between the CP-eNB and an air interface, i.e., the UP-eNB needs to be assisted to establish a user plane channel between the UP-eNB and the UE. Except the Xg-AP, the function of other protocol layers is the same as the function of the related protocol layers in the related art.

UP-eNB (i.e. the above user plane node): the nodes for processing the user plane data, wherein a UP-GW may exist or may not exist between the UP-eNB and the SGW. Besides supporting the user plane function owned by the base station of the LTE system in the related art, when the UP-GW exists between the UP-eNB and the SGW, the UP-eNB further needs to support managing a GTP-U channel between the UP-eNB and the UP-GW, including establishment, deletion and modification, when the UP-GW does not exist between the UP-eNB and the SGW, it only needs support managing a GTP-U channel between the UP-eNB and the SGW, including establishment, deletion and modification, in addition, the function of forwarding the control plane data between the CP-eNB and the UE is further needed to be supported. The user plane protocol stacks of the UP-eNB and the UE are the same as the user plane protocol stack of a UU interface in the related art, and there is no control plane protocol stack between the UP-eNB and the UE. The user plane protocol stacks of the UP-eNB and the UP-GW are the same as the user plane protocol stack of the X2 interface, the control plane protocol stack of the UP-eNB and the UP-GW, as shown in FIG. 18, needs to complete the function of an Xu-AP protocol layer and is mainly used for managing the establishment of the channel of the bottom layer GTP-U. The Xu-AP protocol layer may not exist, in this case, related functions are completed by the CP-eNB performing interaction with the UP-GW and the UP-eNB, respectively. When there is no UP-GW between the UP-eNB and the SGW, the user plane protocol stack between the UP-eNB and the SGW are protocol stack of the S1-U in the related art, this interface is represented as Ss for the moment, and the control plane protocol stack are the S1-MME protocol stack in the related art. The UP-eNB processes the user plane data uploaded by the UE and forwards the uploaded user plane data to the next network element which may be the UP-GW or the SGW, and processes the user plane data delivered by the SGW or the UP-GW and forwarded the delivered user plane data to the UE.

UP-GW: used for forwarding the user plane data, needing to support managing a GTP-U channel between the UP-GW and the SGW, including establishment, deletion and modification, and needing to support managing a GTP-U channel between the UP-GW and the UP-eNB, including establishment, deletion and modification. Reference for the related protocol stack can be made from FIG. 18, and the protocol stack between the UP-eNB and the UP-GW can be made from the reference of the related description about a UP-eNB network element. The protocol stack between the UP-GW and the SGW is the S1-MME protocol stack and the S1-U protocol stack in the related art, which are called as S3 interface temporarily. In addition, an interface may exist between the UP-GW and the CP-eNB, when the interface exits, there is only a control protocol stack, as shown in FIG. 18, and when the interface does not exist, the CP-eNB may manage and control the UP-GW by the UP-eNB and. The UP-GW forwards the user plane data uploaded by the UP-eNB to the next network element which may be the SGW, and forwards the user plane data delivered by the SGW to the UP-eNB.

The SGW is the node of the related art and needs to additionally support managing a GTP-U channel between the SGW and the UP-GW, including establishment, deletion and modification.

These logical nodes may independently become separate new physical nodes, or achieved the logical function on an existing base station or cell. After the UE enters a connected state, one UE is served by one CP-eNB, one UP-GW and one or more UP-eNBs. Wherein, the CP-eNB may be an existing cell, the UP-GW may be an existing cell and is incorporated with the CP-eNB into one, the UP-eNB may be an existing cell and may be incorporated with the CP-eNB into one at the moment, and the UP-eNB may be a new cell and exits as an independent node at the moment. The UP-eNB is the eNB in the related art when being incorporated into one with the CP-eNB.

Figure 17A:
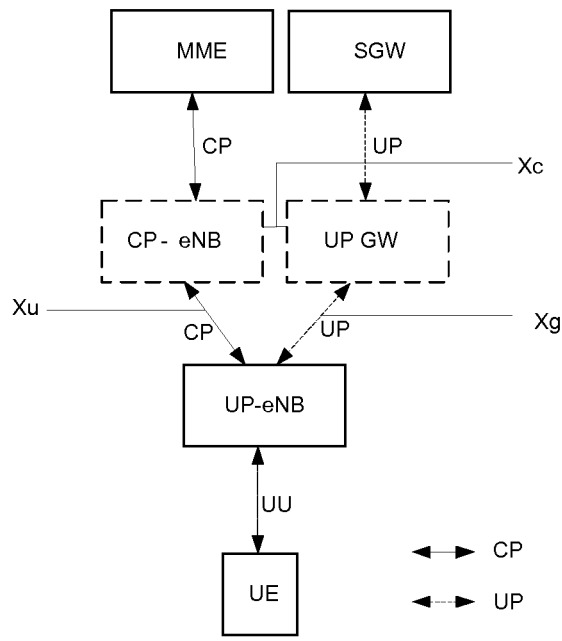
FIG. 17a is a network architecture diagram of UE only having a data connection with a new cell according to an embodiment of the disclosure.
Figure 17B:
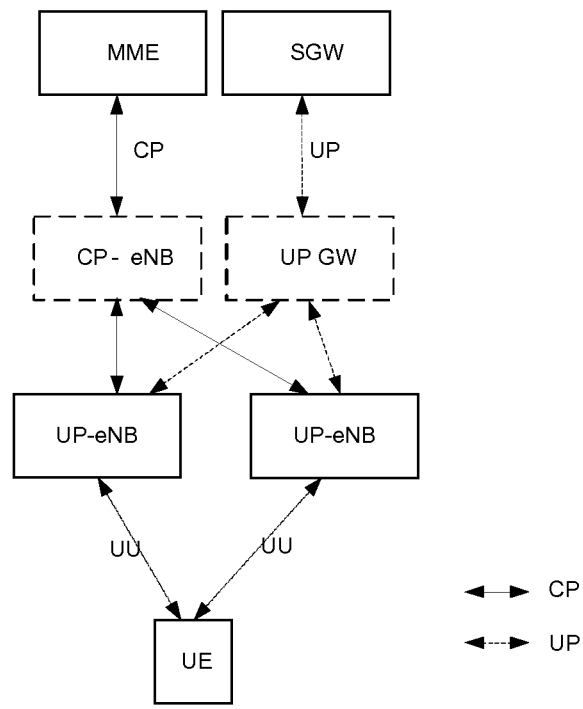
FIG. 17b is a network architecture diagram of UE having a data connection with both the new cell and the existing cell according to an embodiment of the disclosure.

There are two cases, i.e. UE having a data connection with a new cell, and UE having a data connection with both the new cell and the existing cell. FIG. 17a is a network architecture diagram of UE only having a data connection with a new cell according to an embodiment of the disclosure. FIG. 17b is a network architecture diagram of UE having a data connection with both the new cell and the existing cell according to an embodiment of the disclosure. FIG. 18 is a system protocol architecture diagram corresponding to FIGS. 17a and 17b, as shown in FIG. 18.

In the drawing, the interface between the MME and the CP-eNB is an existing S1-MME interface; the interface between the SGW and the UP-GW is an existing S1-U interface, called as an S3 interface temporarily; the interface between the UP-eNB and the CP-eNB is a new interface, called as an Xu interface temporarily; the interface between the UP-eNB and the UP-GW is a new interface, called as an Xg interface temporarily; and the interface between the CP-eNB and the UP-GW is a new interface, called as an Xc interface temporarily. The interface between the UE and the UP-eNB is a user plane interface of the existing UU interface. It should be noted that the CP-eNB, the UP-eNB and the UP-GW are only logical network elements and may belong to the existing cells or new cells in implementation, i.e., the CP-eNB and the UP-GW may be incorporated into one and also may be separated. Meanwhile, the CP-eNB and the UP-eNB also may be incorporated into one (i.e. the current eNB) or separated, and the UP-eNB and the UP-GW may be incorporated into one and also may be separated.

As shown in FIGS. 17a, 17b and 18, the uplink process of the control plane data stream comprise that: the terminal sends the control plane data to the UP-eNB by a UU interface; the UP-eNB only forwards the control plane data to the CP-eNB by an Xu interface; the CP-eNB processes the control plane data; if required, the control plane data is sent to the MME again; and the process is ended. The downlink process of the control plane data stream comprise that: the MME sends the control plane data to the CP-eNB; the CP-eNB processes the received control plane data; if required, the control plane data is sent to the UP-eN by the Xu interface; the UP-eNB only forwards the control plane data to the UE, and the process is ended. The uplink process of the user plane data stream comprise that: the terminal sends the user plane data to the UP-eNB by a UU interface; the UP-eNB processes the user plane data; if required, the user plane data is sent to the UP-GW by an Xg interface; the UP-GW only performs forwarding the user plane data to the SGW, and the process is ended; or the UP-eNB directly sends the user plane data to the SGW, and the process is ended. The downlink process of the user plane data stream comprise that: the SGW sends the user plane data to the UP-GW; the UP-GW only forwards the received user plane data to the UP-eNB by an Xg interface; or the SGW directly sends the user plane data to the UP-eNB, the UP-eNB processes the user plane data, and if required, the data is sent to the UE, and the process is ended.

Xu interface: the interface is used for the CP-eNB to manage and control the UP-eNB, which at least includes the following messages: from the UP-eNB to the CP-eNB: reporting a process problem of the UE conducting random access and reporting when the maximum number of the times of the RLC reaches, Data transferring (SCH data, PCH data, BCH data, MCH data, UCH data etc.); from the CP-eNB to the UP-eNB: Data transferring (SCH data and DCH data), parameter configuration and reconfiguration, MAC restoration, RLC and PDCP entity releasing and re-establishing, verifying consistence protection and integrity algorithm, bottom layer synchronization state reporting and cell deactivation state reporting, etc.

Xc interface: the interface is used for the CP-eNB to manage and control the UP-GW, and used for the UP-GW to feedback or response the CP-eNB.

Xg interface: the interface is only used for forwarding the data stream, because the UP-GW only performs forwarding.

In embodiment I, the message interaction process by the Xu interface is described in the embodiment of the disclosure.

Figure 19A:
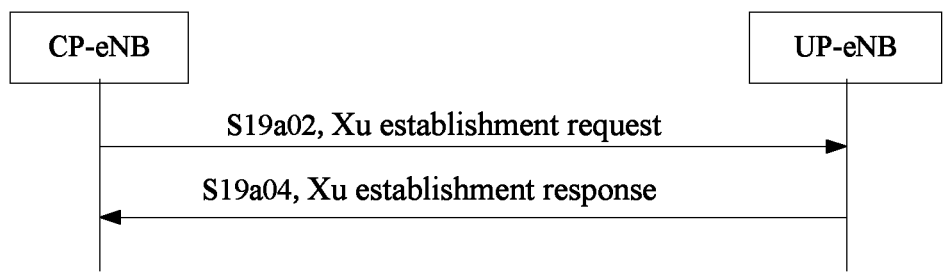
FIG. 19a is a schematic diagram showing the flow of establishing an Xu interface according to an embodiment of the disclosure.

Message I: Xu establishment, used for establishing an Xu interface, FIG. 19a is a schematic diagram showing the flow of establishing an Xu interface according to an embodiment of the disclosure, as shown in FIG. 19a; the process comprises the following steps:

Step S19a02, the CP-eNB sends an Xu establishment request to the UP-eNB, wherein the Xu establishment request includes at least one piece of the following information: the identifier of the CP-eNB, the name of the CP-eNB, the identifier of the UP-GW, the IP address of the UP-GW, etc.

Step S19a04, the UP-eNB receives the Xu establishment request, reserves related resources, performs related configuration and responds an Xu establishment response to the CP-eNB, wherein the Xu establishment response includes at least one piece of the following information: an establishment result, the cause of failure, the identifier of the UP-eNB and the name of the UP-eNB.

Figure 19B:
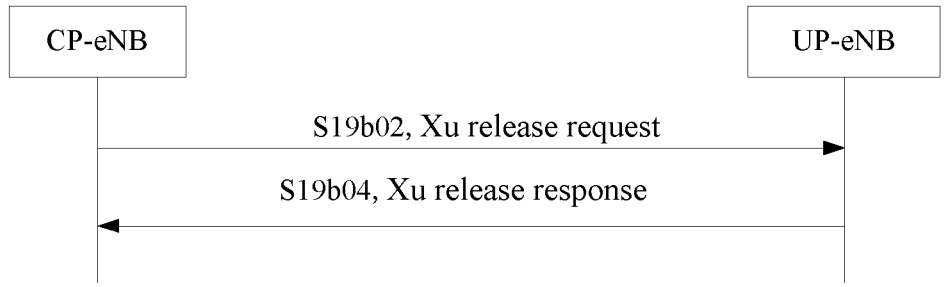
FIG. 19b is a schematic diagram showing the flow of releasing an Xu interface according to an embodiment of the disclosure.

Message II: Xu release, used for releasing an Xu interface, FIG. 19b is a schematic diagram showing the flow of releasing an Xu interface according to an embodiment of the disclosure, as shown in FIG. 19b, and the process comprises the following steps:

Step S19b02, the CP-eNB sends an Xu release request to the UP-eNB, wherein the Xu release request includes at least one piece of the following information: the identifier of the CP-eNB and the name of the CP-eNB.

Step S19b04, the UP-eNB receives the Xu release request, releases the related resources, and responds an Xu release response to the CP-eNB, wherein the Xu release response includes at least one piece of the following information: the identifier of the UP-eNB and the name of the UP-eNB.

Figure 19C:
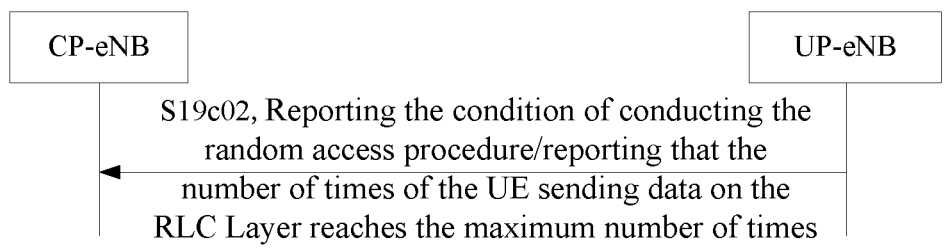
FIG. 19c is a schematic diagram showing the flow of reporting the condition of conducting the random access procedure/reporting that the number of times of sending the RLC reaches the maximum number of times of sending the RLC according to an embodiment of the disclosure.

Message III: used for reporting the condition of conducting random access procedure/the number of times of sending the RLC reaches the maximum number of times of sending the RLC, user for the user to report the condition of conducting random access procedure and report that the number of times of sending the RLC reaches the maximum number of times of sending the RLC, FIG. 19c is a schematic diagram showing the flow of reporting the condition of conducting the random access procedure/reporting that the number of times of sending the RLC reaches the maximum number of times of sending the RLC according to an embodiment of the disclosure, as shown in FIG. 19c, the process comprises the following steps.

Step S19c02, the UE performs a random access procedure on the UP-eNB, and the UP-eNB reports the occurring condition to the CP-eNB, wherein the occurring condition includes at least one piece of the following information: the condition of random access procedure, such as success or failure, the identifier of the UE and the cause of failure, and the above information may be information about multiple random access procedures.

Or, the number of times of the UE sending data on the RLC Layer reaches the maximum number of times, and the UP-eNB reports the occurring condition to the CP-eNB, which may include one piece of the following information: the cause of the failure.

Figure 19D:
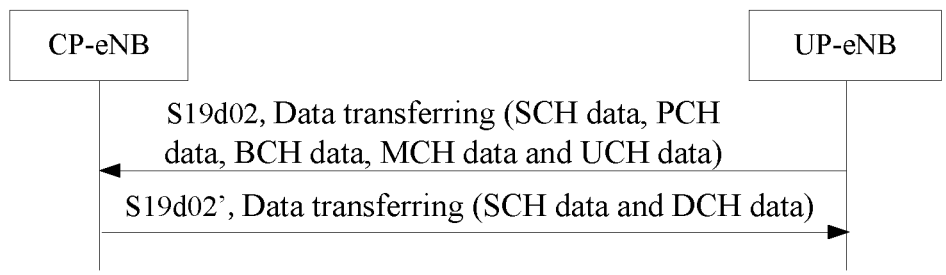
FIG. 19d is a schematic diagram showing the flow of transferring data according to an embodiment of the disclosure.

Message IV: data transferring, used for data transferring data between the UP-eNB and the CP-eNB, FIG. 19d is a schematic diagram showing the flow of transferring data according to an embodiment of the disclosure, as shown in FIG. 19d, the process comprises the following steps.

Step S19d02, the UP-eNB receives the data related to the control plane sent by the UE and transfers the data related to the control plane to the CP-eNB, wherein the data related to the control plane includes at least one piece of the following information: SCH data, PCH data, BCH data, MCH data and UCH data.

Or, in the step S19d02', the CP-eNB receives the data related to the user plane sent by the MME and transfers the data related to the user plane to the UP-eNB, wherein the data related to the user plane includes at least one piece of the following information: SCH data and DCH data.

Figure 19E:
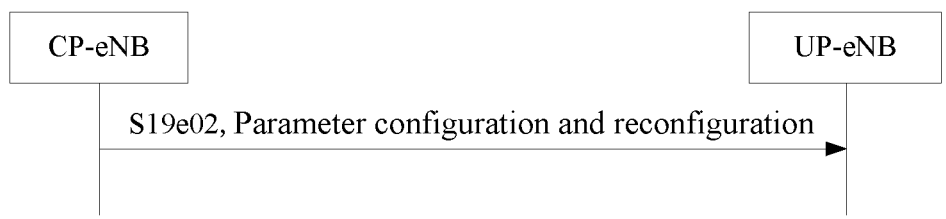
FIG. 19e is a schematic diagram showing the flow of parameter configuration and reconfiguration according to an embodiment of the disclosure.

Message V: parameter configuration and reconfiguration, used for configuring and reconfiguring the parameter of the UP-eNB, managed by the CP-eNB and in fact is used for establishing the context of the UE, FIG. 19e is a schematic diagram showing the flow of parameter configuration and reconfiguration according to an embodiment of the disclosure, as shown in FIG. 19e, the process comprises the following steps.

Step S19e02, the CP-eNB performs configuration or reconfiguration on UE by the UP-eNB and sends information which needs to be configured to the UP-eNB, wherein the information which needs to be configured includes at least one piece of the following information: configuration information of a PHY layer of the UE, configuration information of an MAC layer, configuration information of an RLC layer, configuration information of a PDCP layer and RRC configuration information.

Figure 19F:
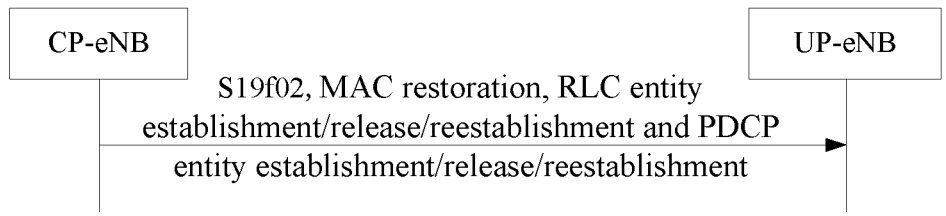
FIG. 19f is a schematic diagram showing the flow of MAC restoration according to an embodiment of the disclosure.

Message VI: MAC restoration, used for the restoration of an MAC layer in the UP-eNB, RLC entity establishment/ release/reestablishment and PDCP entity establishment/re- lease/reestablishment, FIG. 19f is a schematic diagram showing the flow of MAC restoration according to an embodiment of the disclosure, as shown in FIG. 19f; the process comprises the following steps.

Step S19f02, the CP-eNB conducts restoration process on the MAC of the UE by the UP-eNB and sends an MAC restoration message to the UP-eNB, or, the CP-eNB conducts establishment/release/reestablishment process on an RLC entity of UE by the UP-eNB and sends an RLC entity establishment/release/reestablishment message to the UP-eNB, or, the CP-eNB conducts establishment/release/reestablishment process on a PDCP entity of UE by the UP-eNB and sends a PDCP entity establishment/release/reestablishment message to the UP-eNB.

Figure 19G:
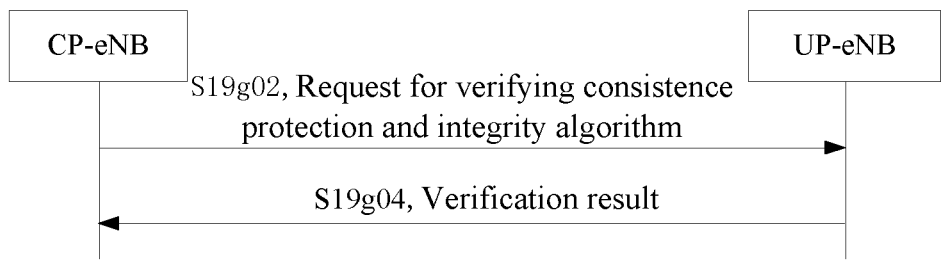
FIG. 19g is a schematic diagram showing the flow of requesting a verifying consistence protection and/or integrity algorithm.

Message VII: request for verifying consistence protection and/or integrity algorithm, used for verifying whether parameters of consistence protection and/or integrity algorithm are feasible, FIG. 19g is a schematic diagram showing the flow of requesting a verifying consistence protection and/or integrity algorithm, as shown in FIG. 19g, the process comprises the following steps.

Step S19g02, the CP-eNB sends a request for verifying consistence protection and/or integrity algorithm to the UP-eNB, wherein the request includes at least one piece of the following information: configuration of consistence protection algorithm and configuration of integrity algorithm.

Step S19g04, after the UP-eNB verifying the consistence protection and/or integrity algorithm, a verification result is replied to the CP-eNB, wherein the verification result includes at least one piece of the following information: the verification result of the consistence protection and the verification result of the integrity algorithm.

Figure 19H:
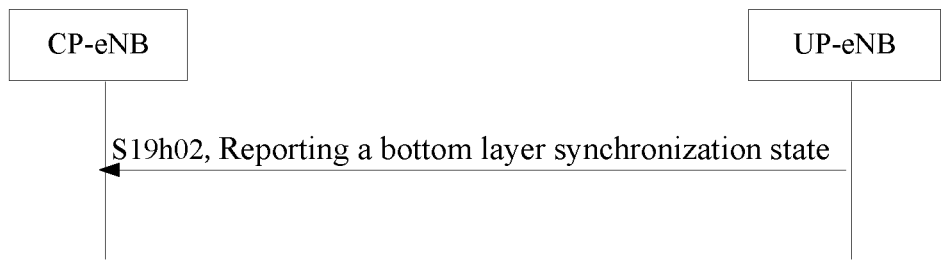
FIG. 19h is a schematic diagram showing the flow of reporting a bottom layer synchronization state.

Message VIII: used for reporting a bottom layer synchronization state, i.e., used for reporting a synchronization state detected in a bottom layer, FIG. 19h is a schematic diagram showing the flow of reporting a bottom layer synchronization state, as shown in FIG. 19h, the process comprises the following steps.

Step S19h02, the UP-eNB detects the synchronization state with the UE according to requirements, and sends the bottom layer synchronization state to the CP-eNB, wherein the bottom layer synchronization state includes at least one piece of the following information: synchronization and out of synchronism.

Figure 19I:
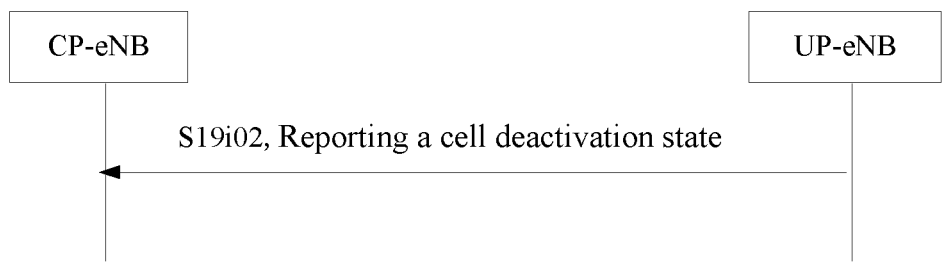
FIG. 19i is a schematic diagram showing the flow of reporting the state of a cell according to an embodiment of the disclosure.

Message IX: cell state reporting, used for reporting a synchronization state detected by a bottom layer, FIG. 19i is a schematic diagram showing the flow of reporting the state of a cell according to an embodiment of the disclosure, as shown in FIG. 19i, the process comprises the following steps.

Step S19i02, the UP-eNB detects an activation state of a serving cell according to requirements, and sends the cell state to the CP-eNB, wherein the cell state includes at least one piece of the following information: cell deactivation.

In embodiment II, the message interaction process on the Xc interface is described in the embodiment of the disclosure.

Figure 20A:
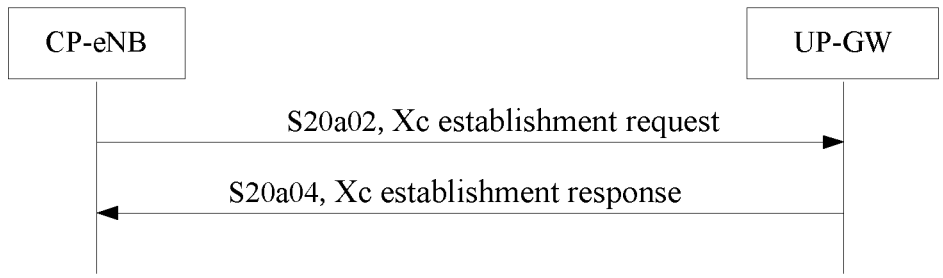
FIG. 20a is a flowchart of establishing an Xc interface according to an embodiment of the disclosure.

Message I: Xc establishment, used for establishing an Xc interface, FIG. 20a is a flowchart of establishing an Xc interface according to an embodiment of the disclosure, as shown in FIG. 20a; the process comprises the following steps.

Step S20a02, the CP-eNB sends an Xc establishment request to the UP-GW, wherein the Xc establishment request includes at least one piece of the following information: the identifier of the CP-eNB and the name of the CP-eNB.

Step S20a04, the UP-GW receives the Xc establishment request, reserves the related resources, performs related configuration and responds an Xc establishment response to the CP-eNB, wherein the Xc establishment response includes at least one piece of the following information: an establishment result, the cause of failure, the identifier of the UP-GW, the IP information about the UP-GW, etc.

Figure 20B:
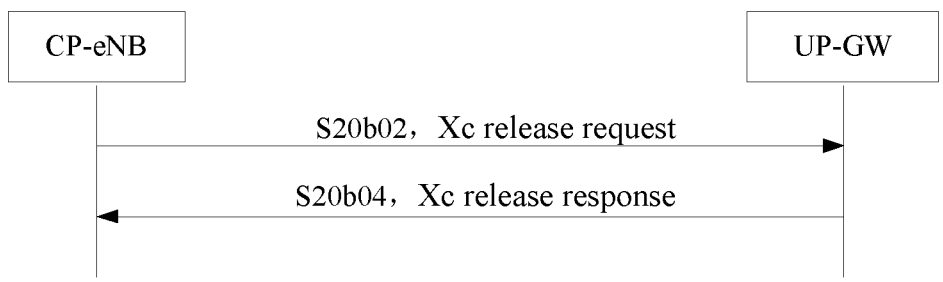
FIG. 20b is a flowchart of releasing an Xc interface according to an embodiment of the disclosure.

Message II: Xc release, used for releasing an Xc interface, FIG. 20b is a flowchart of releasing an Xc interface according to an embodiment of the disclosure, as shown in FIG. 20b; the process comprises the following steps.

Step S20b02, the CP-eNB sends an Xc release request to the UP-GW, wherein the Xc release request includes at least one piece of the following information: the identifier of the CP-eNB and the name of the CP-eNB.

Step S20b04, the UP-GW receives the Xc release request, releases the related resources, performs the related configuration and responds an Xc release response to the CP-eNB, wherein the Xc release response includes at least one piece of the following information: the identifier of the UP-GW and the name of the UP-GW.

Figure 20C:
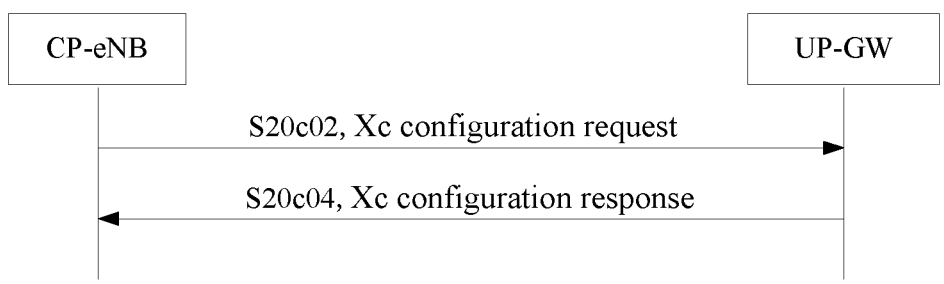
FIG. 20c is a flowchart of configuring an Xc interface according to an embodiment of the disclosure.

Message III: Xc configuration used for configuring the UP-GW and controlled by the CP-eNB, FIG. 20c is a flowchart of configuring an Xc interface according to an embodiment of the disclosure, as shown in FIG. 20c, and the process comprises the following steps.

Step S20c02, the CP-eNB sends an Xc configuring request to the UP-GW, wherein the Xc configuring request includes at least one piece of the following information: the identifier of the UP-eNB, the name of the UP-eNB, the IP address of the UP-eNB, etc.

Step S20c04, the UP-GW receives the Xc configuring request, reserves the related resources, performs the related configuration and responds an Xc configuring response to the CP-eNB, wherein the Xc configuring response includes at least one piece of the following information: configuration result, etc.

In embodiment III, the message interaction process of the Xg interface is described in the embodiment of the disclosure.

Figure 21A:
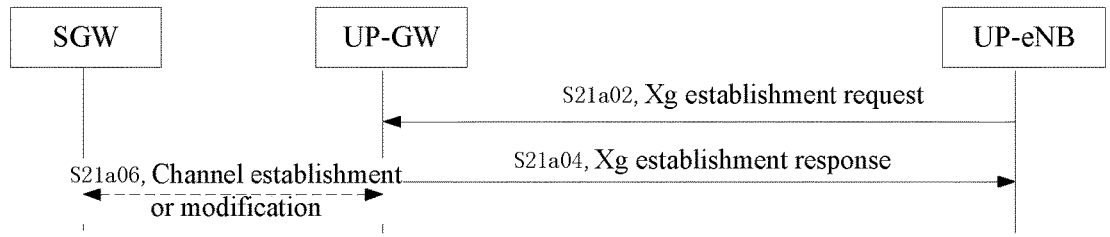
FIG. 21a is a flowchart I showing establishing an Xg interface according to an embodiment of the disclosure.

Message I: Xg establishment, used for establishing an Xg interface, FIG. 21a is a flowchart I showing establishing an Xg interface according to an embodiment of the disclosure, as shown in FIG. 21a, the process comprises the following steps.

Step S21a02, the UP-eNB sends an Xg establishment request to the UP-GW, wherein the Xg establishment request includes at least one piece of the following information: the identifier of the UP-eNB, the name of the UP-eNB, the IP address of the UP-eNB, etc.

Step S21a04, the UP-GW receives the Xg establishment request, reserves the related resources, performs the related configuration and responds an Xg establishment response to the UP-eNB, wherein the Xg establishment response includes at least one piece of the following information: an establishment result, the cause of failure, the identifier of the UP-GW, the IP information about the UP-GW, etc.

Step S21a06, a related channel is established between the UP-GW and the SGW.

Figure 21B:
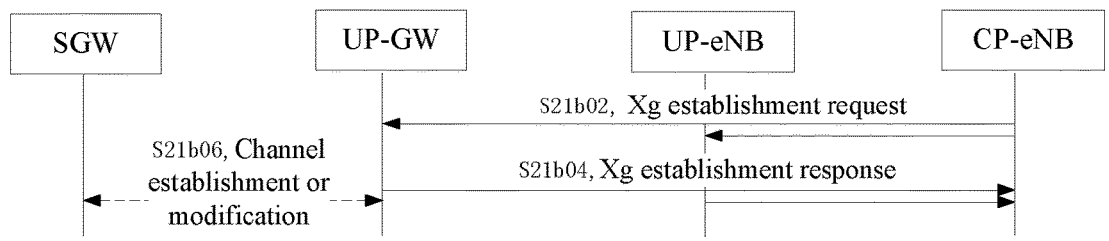
FIG. 21b is a flowchart II showing establishing an Xg interface according to an embodiment of the disclosure.

FIG. 21b is a flowchart II showing establishing an Xg interface according to an embodiment of the disclosure, as shown in FIG. 21b; the process comprises the following steps.

Step S21b02, the CP-eNB sends an Xg establishment request to the UP-GW, wherein the Xg establishment request includes at least one piece of the following information: the identifier of the UP-eNB, the name of the UP-eNB and the IP address of the UP-eNB; and the CP-eNB sends an Xg establishment request to the UP-eNB, wherein the Xg establishment request includes at least one piece of the following information: the identifier of the UP-GW, the name of the UP-GW, and the IP address of the UP-GW.

Step S21b04, the UP-GW receives the Xg establishment request, reserves the related resources, performs the related configuration and responds an Xg establishment response to the CP-eNB, wherein the Xg establishment response includes at least one piece of the following information: an establishment result, the cause of failure, the identifier of the UP-GW, the IP information about the UP-GW, etc.; and the UP-eNB receives the Xg establishment request, reserves the related resources, performs the related configuration and responds an Xg establishment response to the CP-eNB, wherein the Xg establishment response includes at least one piece of the following information: an establishment result, the cause of failure, the identifier of the UP-eNB, the IP information about the UP-eNB, etc.

Step S21b06, a related channel is established between the UP-GW and the SGW.

Figure 21C:
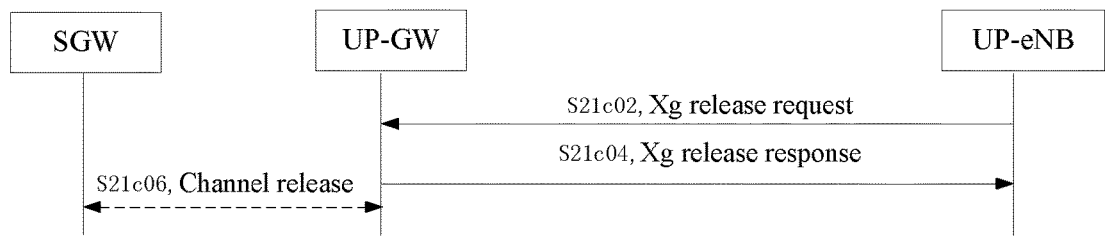
FIG. 21c is a flowchart I showing releasing an Xg interface according to an embodiment of the disclosure.

Message II: Xg release, used for releasing an Xg interface, FIG. 21c is a flowchart I showing releasing an Xg interface according to an embodiment of the disclosure, as shown in FIG. 21c, the process comprises the following steps.

Step S21c02, the UP-eNB sends an Xg release request to the UP-GW, wherein the Xg release request includes at least one piece of the following information: the identifier of the UP-eNB and the name of the UP-eNB.

Step S21c04, the UP-GW receives the Xg release request, releases the related resources, performs the related configuration and responds an Xg release response to the UP-eNB, wherein the Xg release response may include one piece of the following information: the identifier of the UP-GW and the name of the UP-GW.

Step S21c06, a related channel between the UP-GW and the SGW is released.

Figure 21D:
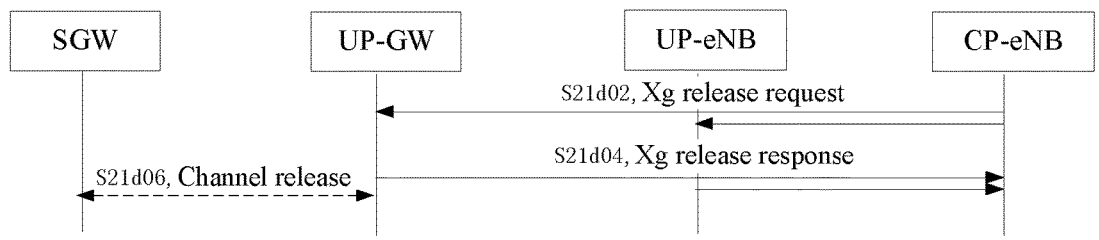
FIG. 21d is a flowchart II showing releasing an Xg interface according to an embodiment of the disclosure.

FIG. 21d is a flowchart II showing releasing an Xg interface according to an embodiment of the disclosure, as shown in FIG. 21d, and the process comprises the following steps.

Step S21d02, the UP-eNB sends an Xg release request to the UP-GW, wherein the Xg release request includes at least one piece of the following information: the identifier of the UP-eNB and the name of the UP-eNB; and the CP-eNB sends an Xg release request to the UP-eNB, wherein the Xg release request includes at least one piece of the following information: the identifier of the UP-GW, the name of the UP-GW, and the IP address of the UP-GW.

Step S21d04, the UP-GW receives the Xg release request, releases the related resources, performs the related configuration and responds an Xg release response to the UP-eNB, wherein the Xg release response may include one piece of the following information: the identifier of the UP-GW and the name of the UP-GW; and the UP-eNB receives the Xg release request, releases the related resources, performs the related configuration and responds an Xg release response to the UP-eNB, wherein the Xg release response may include one piece of the following information: the identifier of the UP-eNB and the name of the UP-eNB, the IP information of the UP-eNB, etc.

Step S21d06, a related channel between the UP-GW and the SGW is released.

Figure 21E:
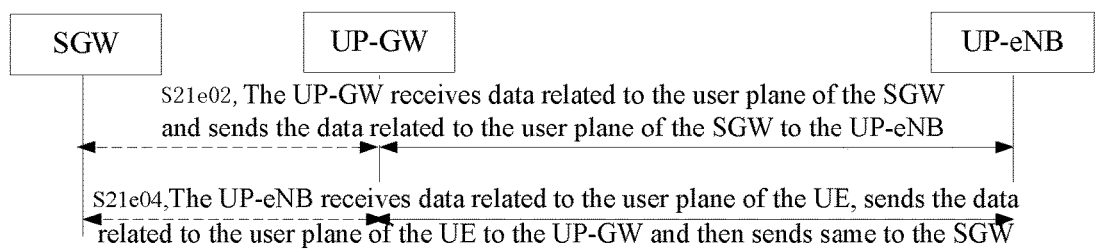
FIG. 21e is a flowchart showing transferring data according to an embodiment of the disclosure.

Message III: data transferring, used for transferring data between the UP-GW and the UP-eNB, FIG. 21e is a flowchart showing transferring data according to an embodiment of the disclosure, as shown in FIG. 21e, the process comprises the following steps.

Step S21e02, the UP-GW receives data related to the user plane of the SGW and sends the data related to the user plane of the SGW to the UP-eNB.

Step S21e04, the UP-eNB receives data related to the user plane of the UE, sends the data related to the user plane of the UE to the UP-GW and then sends the data related to the user plane of the UE to the SGW.

Figure 22:
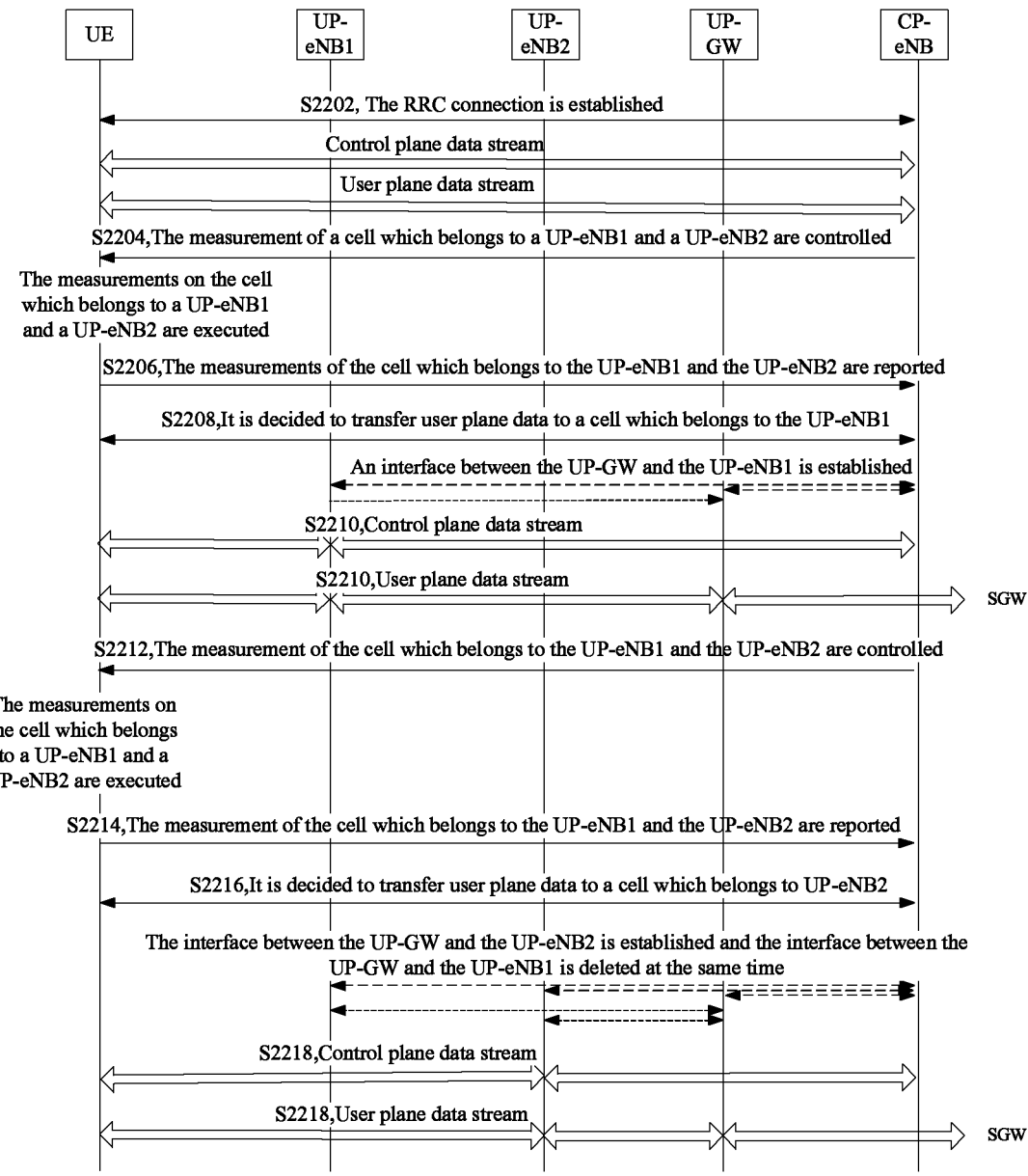
FIG. 22 is a flowchart showing UE only having a data connection processing with a new cell according to an embodiment of the disclosure.

Embodiment IV, the UE only has a data connection with the new cell in the embodiment of the disclosure, and the Xc interfaces and the Xu interfaces have already been established. When the CP-eNB and the CP-GW are incorporated into one, the Xc interface does not need to be established or may become an internal interface. FIG. 22 is a flowchart showing UE only having a data connection processing with a new cell according to an embodiment of the disclosure, as shown in FIG. 22, the process comprises the following steps.

Step S2202, the UE establishes an RRC connection with a cell which belongs to the CP-eNB, the UE accesses to the cell successfully, and the UE performs normal control plane data stream interaction and user plane data stream interaction with the cell which belongs to the CP-eNB.

Step S2204, the cell under the CP-eNB performs measurement control on the UE and indicates the UE to measure the cell which belongs to a UP-eNB1 and a UP-eNB2.

Step S2206, the UE measures the cell which belongs to the UP-eNB1 and the UP-eNB2 and reports a measurement report.

Step S2208, the CP-eNB decides to transfer a user plane data stream to a cell which belongs to UP-eNB1 according to the measurement report, when there is no UP-GW, the interface between the UP-GW and the UP-eNB1 does not need to be established. When there is a UP-GW, the interface between the UP-GW and the UP-eNB1 needs to be established, these two steps may be implemented in no order. There are two methods to establish the interface between the UP-GW and the UP-eNB1, and reference can be made from embodiment III.

Step S2210, after the migration is completed, the UE performs normal control plane data stream interaction with the cell which belongs to the CP-eNB, during which the UP-eNB1 forwarding is involved, and the UE performs normal user plane data stream interaction with the cell under the UP-eNB1, during which the UP-GW forwarding and sending to the SGW or directly sending to the SGW are involved.

Step S2212, the cell under the CP-eNB performs measurement control on the UE and indicates the UE to measure the cell which belongs to a UP-eNB1 and a UP-eNB2.

Step S2214, the UE measures the cell which belongs to the UP-eNB1 and the UP-eNB2 and reports a measurement report.

Step S2216, the CP-eNB decides to transfer a user data stream to a cell which belongs to the UP-eNB2. When there is no UP-GW, the interface between the UP-GW and the UP-eNB2 does not need to be established. When there is a UP-GW, it is required to establish an interface between the UP-GW and the UP-eNB2, and it is required to release the interface between the UP-GW and the UP-eNB1, these steps may be implemented in no order, wherein the establishment of the interface between the UP-GW and the UP-eNB2 is the same as that in step IV.

Step S2218, after the migration is completed, the UE performs normal control plane data stream interaction with the cell which belongs to the CP-eNB, during which the UP-eNB2 forwarding is involved, and the UE performs normal user plane data stream interaction with the cell under the UP-eNB2, during which the UP-GW forwarding and sending to the SGW or directly sending to the SGW are involved.

Figure 23:
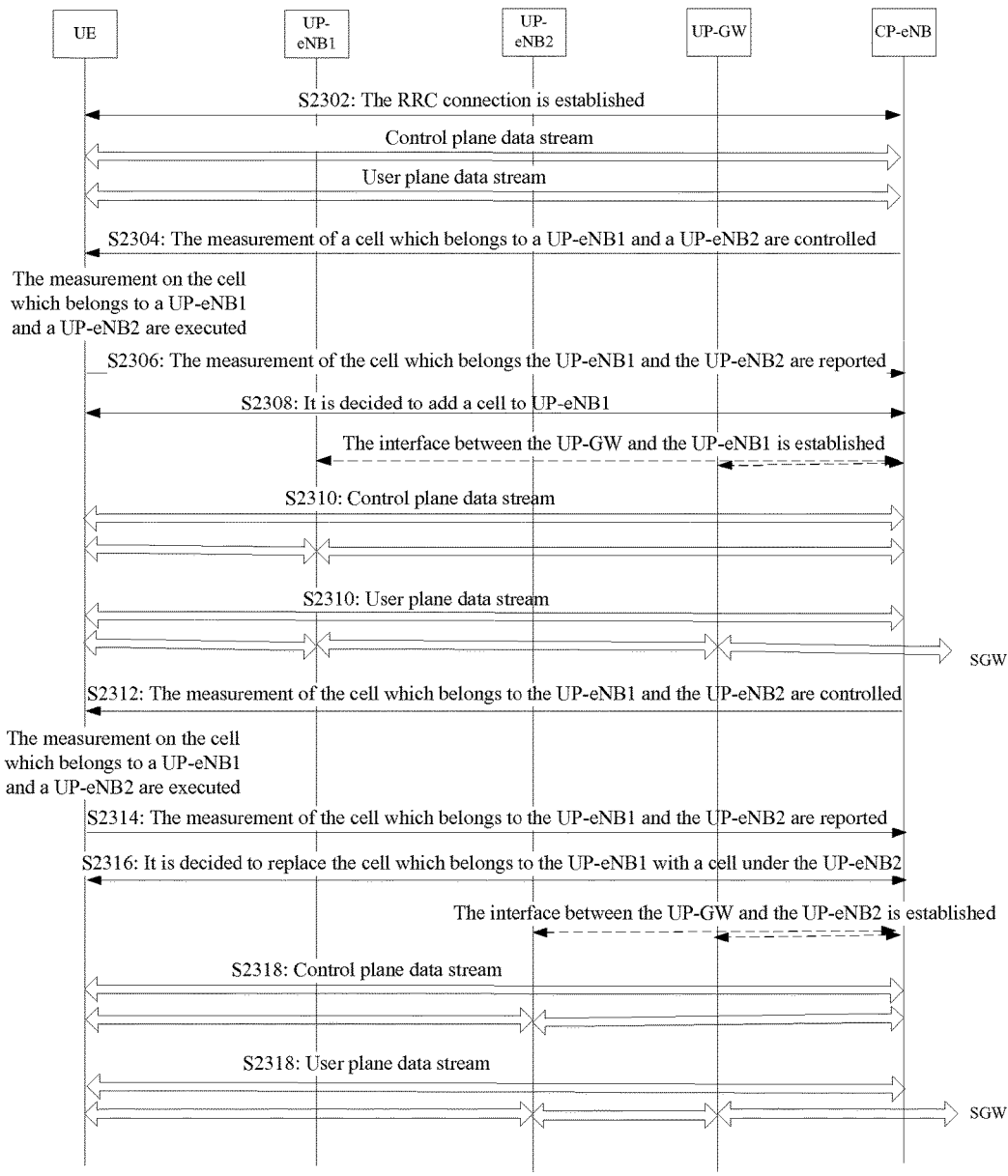
FIG. 23 is a network architecture diagram showing UE having a data connection processing with both a new cell and the existing cell according to an embodiment of the disclosure.

Embodiment V, the UE has a data connection with both the new cell and the existing cell in the embodiment of the disclosure, and the Xc and Xu interfaces have already been established. When the CP-eNB and the CP-GW are incorporated into one, the Xc interface does not need to be established or may become an internal interface. FIG. 23 is a network architecture diagram showing UE having a data connection processing with both a new cell and the existing cell according to an embodiment of the disclosure, as shown in FIG. 23, the process comprises the following steps.

Step S2302, the UE establishes an RRC connection with a cell which belongs to the CP-eNB, the UE accesses to the cell successfully, and the UE performs normal control plane data stream interaction and user plane data stream interaction with the cell which belongs to the CP-eNB.

Step S2304, the cell which belongs to the CP-eNB performs measurement control on the UE and indicates the UE to measure the cell which belongs to a UP-eNB1 and a UP-eNB2.

Step S2306, the UE measures the cell which belongs to the UP-eNB1 and the UP-eNB2 and reports a measurement report.

Step S2308, the CP-eNB decides to add a cell which belongs to the UP-eNB1 according to the measurement report. When there is no UP-GW, the interface between the UP-GW and the UP-eNB1 does not need to be established. When there is a UP-GW, it is required to establish an interface between the UP-GW and the UP-eNB1; these two steps may be implemented in no order, wherein the establishment of the interface between the UP-GW and the UP-eNB1 is the same as that in step IV.

Step S2310, after the adding is completed, the UE performs normal control plane data stream interaction and user plane data stream interaction with the cell which belongs to the CP-eNB, wherein the UE performs normal user plane data stream interaction with the cell which belongs to the UP-eNB1, during which the UP-GW forwarding and sending to the SGW or directly sending to the SGW are involved.

Step S2312, the cell which belongs to the CP-eNB performs measurement control on the UE and indicates the UE to measure the cell which belongs to a UP-eNB1 and a UP-eNB2.

Step S2314, the UE measures the cell which belongs to the UP-eNB1 and the UP-eNB2 and reports a measurement report.

Step S2316, the CP-eNB decides to transfer a user data stream from the UP-eNB1 to a cell which belongs to the UP-eNB2. When there is no UP-GW, the interface between the UP-GW and the UP-eNB2 does not need to be established. When there is a UP-GW, it is required to establish an interface between the UP-GW and the UP-eNB2, and it is required to release the interface between the UP-GW and the UP-eNB1, these steps may be implemented in no order, wherein the establishment of the interface between the UP-GW and the UP-eNB2 is the same as that in step IV.

Step S2318, after the migration is completed, the UE performs normal control plane data stream interaction and user plane data stream interaction with the cell which belongs to the CP-eNB, during which the UP-eNB2 forwarding is involved, wherein the UE performs normal user plane data stream interaction with the cell which belongs to the UP-eNB2, during which the UP-GW forwarding and sending to the SGW or directly sending to the SGW are involved.

Figure 24:
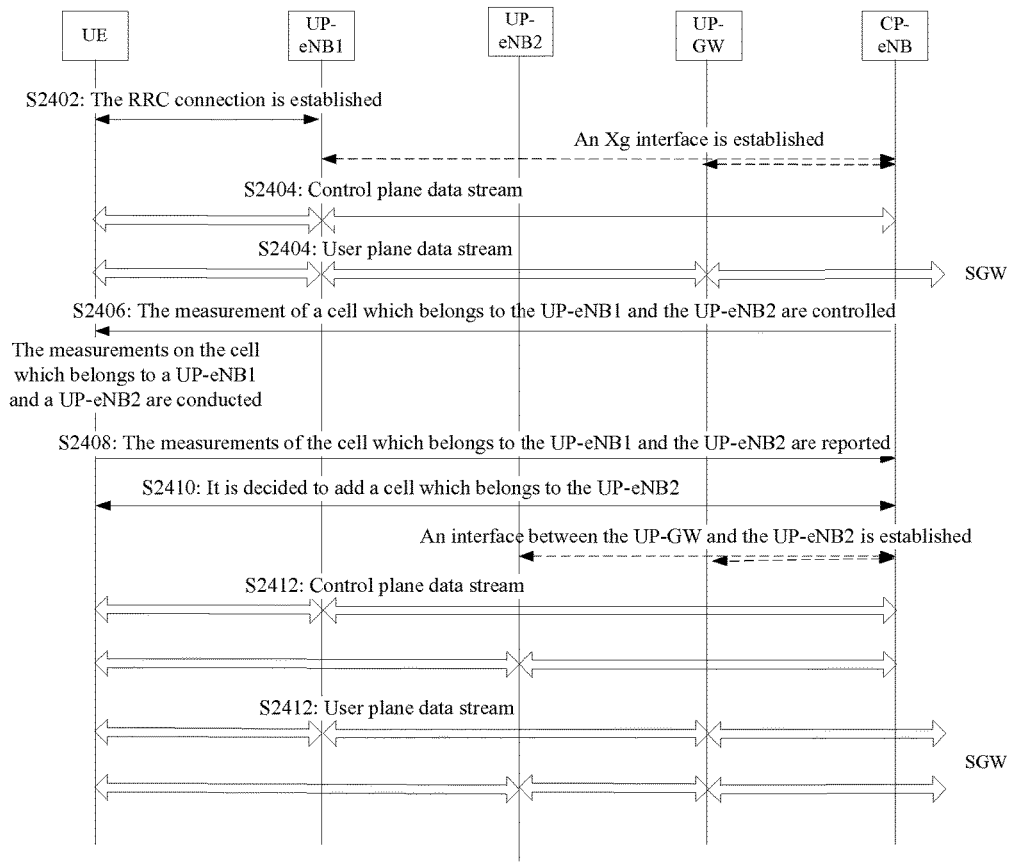
FIG. 24 is a network architecture diagram showing UE having a data connection processing with the two new cells according to an embodiment of the disclosure.

In embodiment VI, in this embodiment, it is initially configured such that the UE only has a data connection with a new cell, and then a new cell is added, so that it is evolved to have a data connection with both the two new cells. The Xc interface and the Xu interfaces have already been established. When the CP-eNB and the CP-GW are incorporated into one, the Xc interface does not need to be established or may become an internal interface. FIG. 24 is a network architecture diagram showing UE having a data connection processing with the two new cells according to an embodiment of the disclosure, as shown in FIG. 24, the process comprises the following steps.

Step S2402, the UE establishes an RRC in a cell which belongs to the UP-eNB1. When there is no UP-GW; the interface between the UP-GW and the UP-eNB1 does not need to be established. When there is a UP-GW, the interface between the UP-GW and the UP-eNB1 needs to be established. These two steps may be implemented in no order.

Step S2404, the UE performs normal control plane data stream interaction with the cell which belongs to the UP-eNB1, during which the data stream is forwarded to the MME after being processed by the CP-eNB, the UE performs normal user plane data stream interaction with the cell which belongs to the UP-eNB1, during which the data stream is forwarded by the UP-GW and is sent to the SGW or is directly sent to the SGW.

Step S2406, the CP-eNB performs measurement control on the UE and indicates through the UP-eNB1 the UE to measure the cell which belongs to a UP-eNB1 and a UP-eNB2.

Step S2408, the UE measures the cell which belongs to the UP-eNB1 and the UP-eNB2 and reports a measurement report.

Step S2410, the CP-eNB decides to add a cell which belongs to the UP-eNB2 according to the measurement report. When there is no UP-GW, the interface between the UP-GW and the UP-eNB2 does not need to be established. When there is a UP-GW, the interface between the UP-GW and the UP-eNB2 needs to be established, and these two steps may be implemented in no order.

Step S2412, after the adding is completed, the UE performs normal control plane data stream interaction with the cell which belongs to the UP-eNB1, during which the data stream is forwarded to the MME after being processed by the CP-eNB, the UE performs normal user plane data stream interaction with the cell which belongs to the UP-eNB1, during which the data stream is forwarded by the UP-GW and is sent to the SGW or is directly sent to the SGW. The UE performs normal control plane data stream interaction with the cell which belongs to the UP-eNB2, during which the data stream is forwarded to the MME after being processed by the CP-eNB, the UE performs normal user plane data stream interaction with the cell which belongs to the UP-eNB2, during which the data stream is forwarded by the UP-GW and is sent to the SGW or is directly sent to the SGW.

The embodiments and preferred implementation of the disclosure are described below with regard to the network topology of the cellular system.

Figure 25:
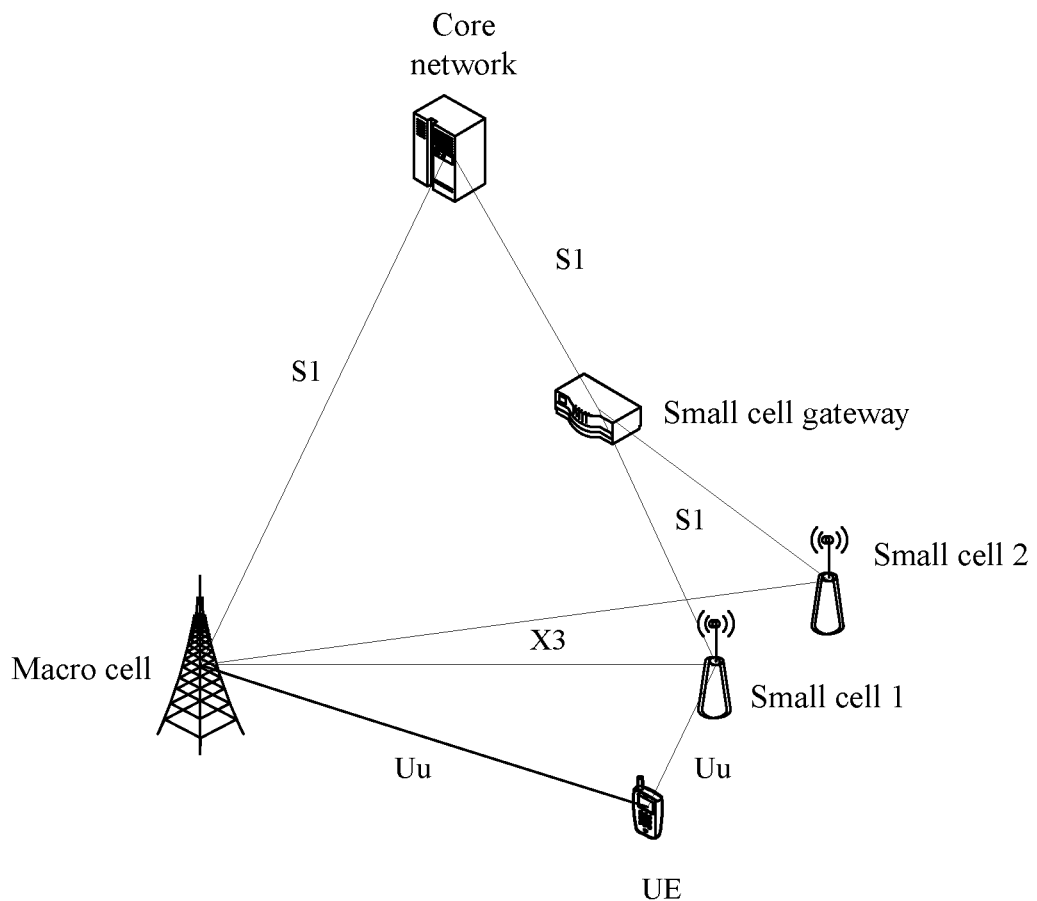
FIG. 25 is a schematic diagram of a network topology based on a cellular system according to an embodiment of the disclosure.

In order to reduce the frequency of transferring the user information between base stations (e.g., the context of a control plane related to UE), a user plane gateway may be provided. A small cell may be connected to a core network through a network node called a small cell gateway, or is directly to the core network, and this channel is controlled and managed by a macro cell. A signalling channel of a control plane between the UE and the core network is also established through the macro cell. FIG. 25 is a schematic diagram of a network topology based on a cellular system according to an embodiment of the disclosure, as shown in FIG. 25, when the small cell and the macro cell have an overlapped coverage area, the terminal have a wireless link connection with both the macro cell and the small cell. There is a physical or logical connection, called as an Xx interface between the small cell and the macro cell. There is an S1 interface between the macro cell and the core network. The small cell is connected to the core network through a network node called as a small cell gateway.

The terminal has established a signalling channel with the core network through the macro cell, that is to say, a radio bearer (SRB) of a wireless access layer between the terminal and the macro cell and an S1 signalling connection between the macro cell and the core network have been established. The signalling connection of the terminal between the macro cell and the network core on the S1 interface is represented by a pair of terminal identifiers, i.e. the identifier eNB UE S1 AP ID of the terminal on the macro cell and the identifiers MME UE S1 AP ID of the terminal on the core network.

The functions of various network nodes in the architecture of the cellular system are described below.

Core network: besides the existing functions of a core network of the LTE system Release 11, a function for supporting establishing a GTP-U channel between the core network and the small cell gateway is further needed.

Macro cell: besides having the functions owned by the base station of the LTE system Release 11, further supporting establishing a signalling connection of an Xx interface among small cells, and coordinating to establish, delete or update a new GTP-U channel between the small cell and the core network. The macro cell can establish a radio bearer between the terminal and the small cell. The Xx interface further supports the function of forwarding an IP data packet between the small cell and the macro cell.

Small cell: supporting establishing a data radio bearer (DRB) of an LTE system between the small cell and the terminal, and having all the functions for communicating on the DRB. The small cell can establish, delete or update a GTP-U channel among core networks, and this GTP-U channel may pass through a small cell gateway.

Small cell gateway: supporting managing a GTP-U channel, including establishing, deleting and updating, between the small cell and the core network. When a certain E-RAB of a certain terminal transfers among small cells, the small cell gateway shields the influence to the core network which may be caused by such transferring by means of maintaining the GTP-U channel from the small cell gateway to the core network. The small cell gateway is transparent for the macro cell.

Figure 26:
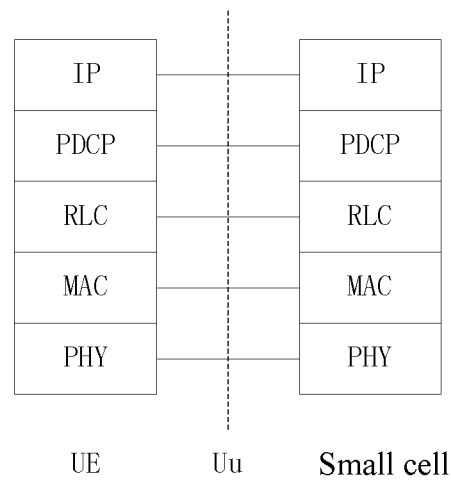
FIG. 26 is a protocol stack diagram of a Uu interface according to an embodiment of the disclosure.
Figure 27:
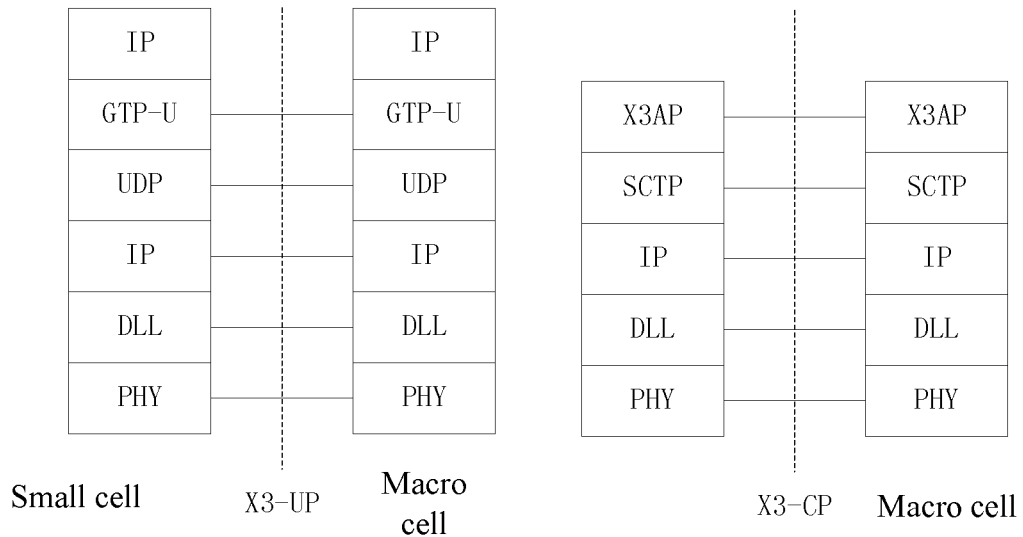
FIG. 27 is a protocol stack diagram of an Xx interface according to an embodiment of the disclosure.
Figure 28:
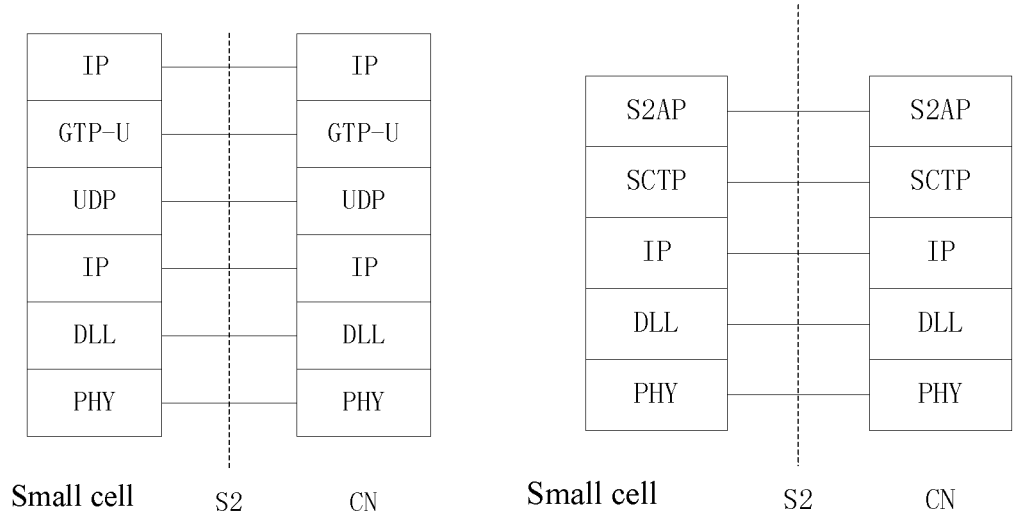
FIG. 28 is a protocol stack diagram of an S2 interface (without GW) according to an embodiment of the disclosure.
Figure 29:
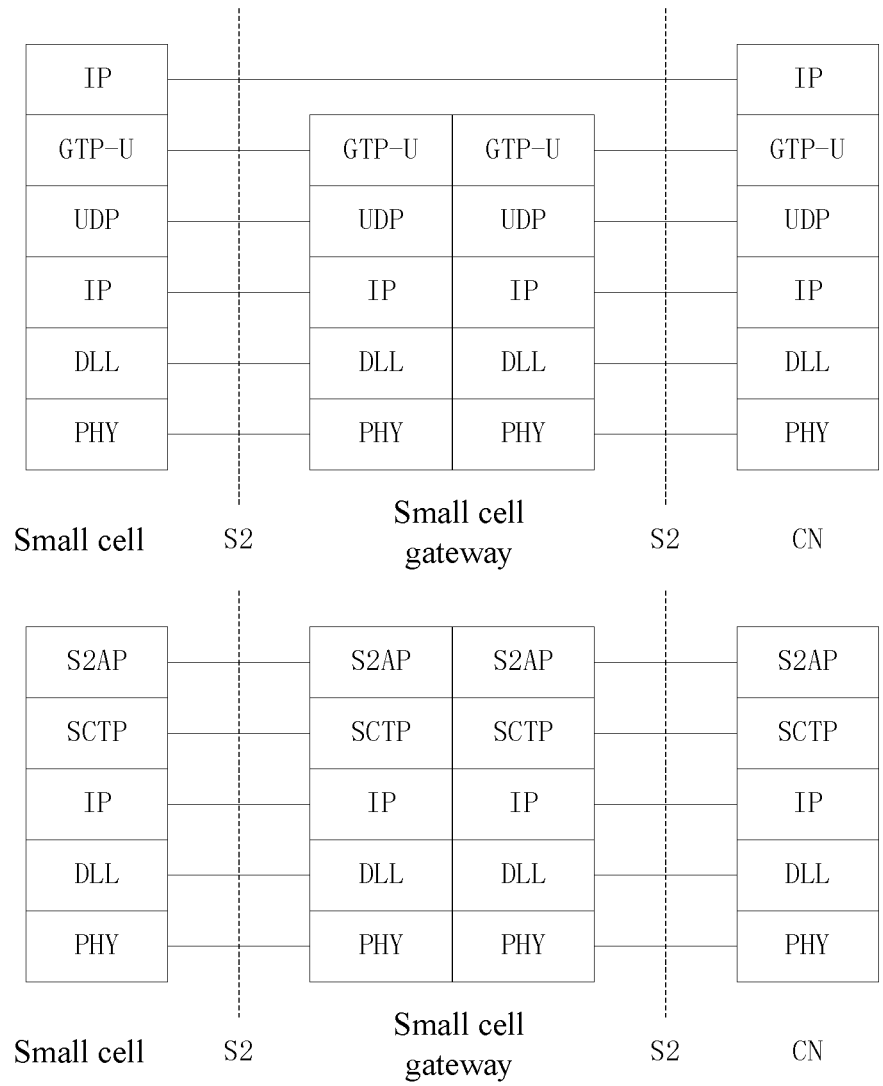
FIG. 29 is a protocol stack diagram of an S2 interface (with GW) according to an embodiment of the disclosure.

FIGS. 26-29 are protocol stack diagrams of a Uu interface, an Xx interface and an S2 interface, wherein FIG. 26 is a protocol stack diagram of a Uu interface according to an embodiment of the disclosure; FIG. 27 is a protocol stack diagram of an Xx interface according to an embodiment of the disclosure; FIG. 28 is a protocol stack diagram of an S2 interface (without GW) according to an embodiment of the disclosure; and FIG. 29 is a protocol stack diagram of an S2 interface (with GW) according to an embodiment of the disclosure.

Figure 30:
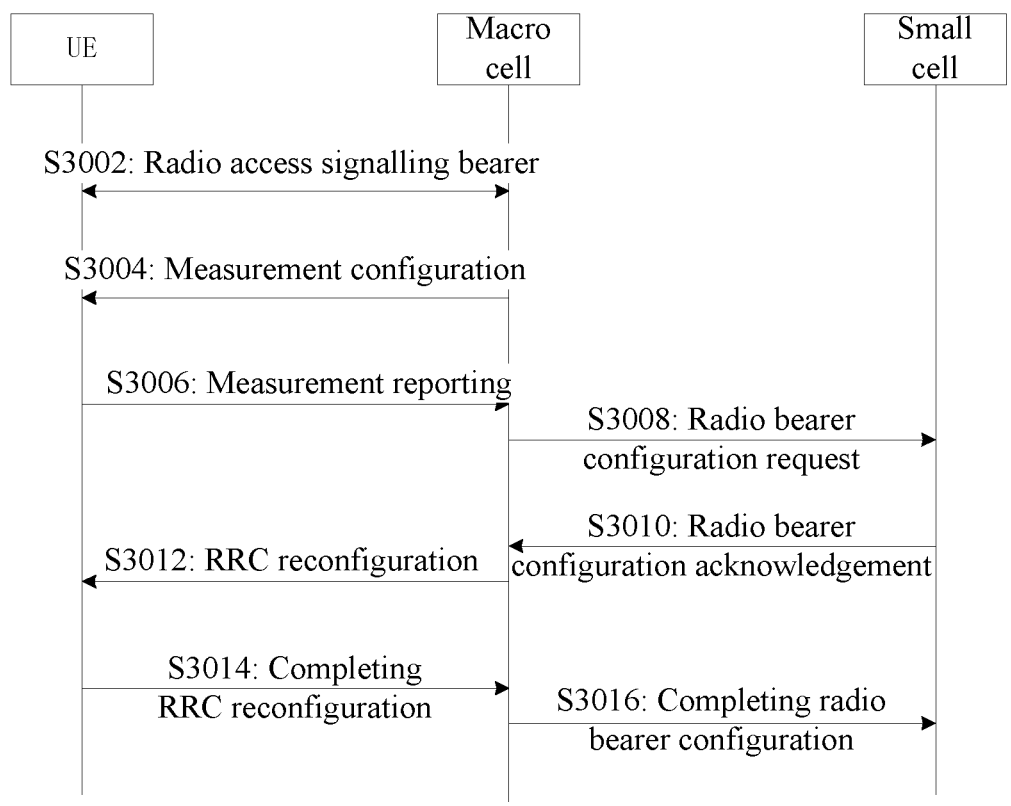
FIG. 30 is a flowchart showing establishing and deleting a radio bearer according to an embodiment of the disclosure.

Example embodiment I, the establishment and deletion of a radio bearer, FIG. 30 is a flowchart showing establishing and deleting a radio bearer according to an embodiment of the disclosure, as shown in FIG. 30. The process comprises the following steps.

Step S3002, an RRC connection, i.e. radio access signalling bearer (SRB bearer) is established between the terminal and the macro cell according to the existing process of an LTE system.

Step S3004, the macro cell configures a measurement task to the terminal, wherein the small cell is also configured as a measuring object therein.

Step S3006, the terminal reports a measuring result including a measuring result regarding the small cell, such as the identification information about the small cell and the RRM measuring result of the small cell.

Step S3008, the macro cell sends a radio bearer configuration request message to the small cell, wherein context information about the terminal is carried in the radio bearer configuration request message, and the context information about the terminal includes at least the configuration information about a radio bearer which needs to be established or deleted. When the radio bearer of the terminal is established on the small cell for the first time, the radio bearer configuration request message at least further includes wireless capability information about the terminal. When it is required from the radio bearer configuration request message to delete a certain radio bearer, the data packet of the user plane related to the radio bearer on the small cell possibly needs to be forwarded to the macro cell.

Step S3010, after storing the context information about the terminal, the small cell sends a radio bearer configuration acknowledgement message to the macro cell. When the purpose of Step S3008 is to configure a radio bearer, configuration information of this radio bearer configured by the small cell is further involved in this step.

Step S3012, the macro cell forwards an RRC reconfiguration message to the terminal, wherein radio configuration of the radio bearer, which is fed back by the small cell is carried in the RRC reconfiguration message. When the radio bearer of the terminal is configured on the small cell for the first time, description information about the small cell is further carried in the RRC reconfiguration message.

Step S3014, the terminal feeds back to the macro cell an RRC reconfiguration completing message which represents that the radio bearer is established or deleted, and the RRC reconfiguration completing message is fed back to the small cell through the macro cell.

Step S3016, the macro cell feeds back to the small cell that the radio bearer configuration is completed.

The terminal has acquired downlink synchronization information about the small cell in the measuring phase. The value of timing in advance between the terminal and the small cell is in default 0. Technically, it because that the coverage area of the small cell is far less than the distance represented by the LTE system TA=1, so that an additional uplink synchronization process is not needed. After obtaining the acknowledgement message from the terminal, the small cell may start to perform the data communication with the terminal. When the target of this process is to delete a certain radio bearer which has been established between a certain terminal and the small cell, the small will stop scheduling this radio bearer after obtaining a configuration acknowledgement.

Figure 31:
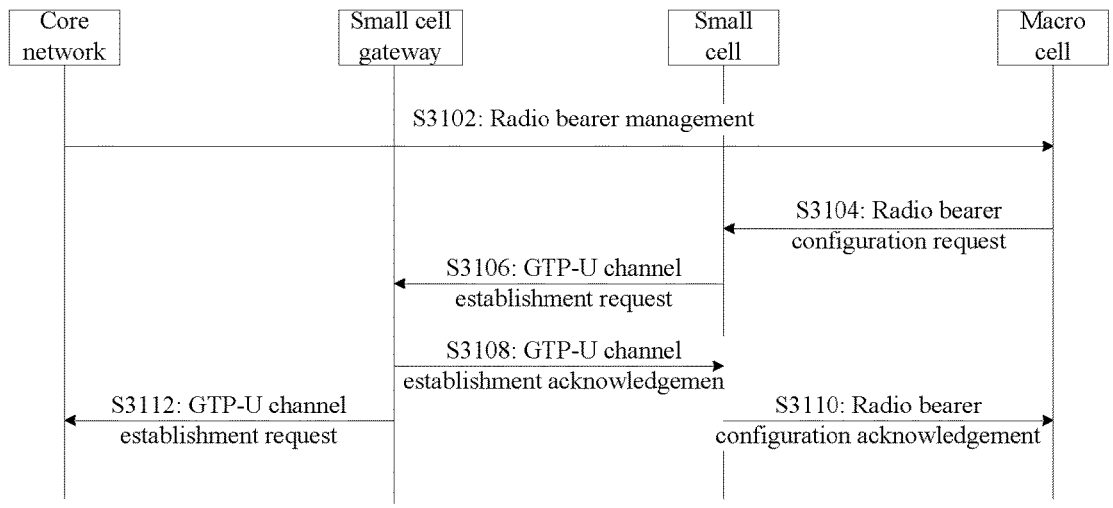
FIG. 31 is a flowchart showing establishing and deleting a GTP-U channel according to an embodiment of the disclosure.

Example embodiment II, the establishment and deletion of a GTP-U channel, FIG. 31 is a flowchart showing establishing and deleting a GTP-U channel according to an embodiment of the disclosure, as shown in FIG. 31, and the process comprises the following steps.

Notes: in all the following processes, for the signalling among the small cell, the small cell gateway and the core network, the identifier of the signalling on the macro cell and the core network are reused by the identifier of the signalling connection, i.e., the identifier of the signalling on the macro cell and the core network are respectively the identifiers eNB UE S1 AP ID of the terminal on the macro cell and identifiers MME UE S1 AP ID of the terminal on the core network. By using such a manner, from the aspect of the core network, there is only one signalling connection between the core network and a radio access network node.

Step S3102, the core network sends a radio access bearer management message to the macro cell through an S1 interface, and the radio access bearer management message at least includes a transport layer address of a GTP-U channel corresponding to a certain radio access bearer (E-RAB) on a core network (TNL address-CN), a virtual connection identifier of the GTP-U channel (GTP-TEID-CN) and information about the E-RAB.

Step S3104, the macro cell sends the radio bearer configuration request message to the small cell, and the radio bearer configuration request message at least includes the above TNL address-CN and GTP-TEID-CN, and the information about the E-RAB.

Step S3106, the small cell sends a GTP-U channel establishment request message to the small cell gateway, and the GTP-U channel establishment request message at least includes the above TNL address-CN and GTP-TEID-CN, a transport layer address of a GTP-U channel corresponding to the E-RAB on the small cell (TNL address-SC), a virtual connection identifier of the GTP-U channel (GTP-TEID-SC) and information about the E-RAB. When there is no small cell gateway in the network structure, this GTP-U channel establishment request message is directly sent to the core network, and the flow is ended.

Step S3108, the small cell gateway sends a GTP-U channel establishment acknowledgement message, and the GTP-U channel establishment acknowledgement message at least includes a transport layer address of a GTP-U channel corresponding to the E-RAB on the small cell gateway (TNL address-SGW-SC) and a virtual connection identifier of the GTP-U channel (GTP-TEID-SGW-SC), and information about the E-RAB.

Step S3110, the small cell sends the radio bearer configuration acknowledgement message to the macro cell to acknowledgement that the GTP-U channel to the core network is established.

Step S3112, the small cell gateway sends a message to the core network, and the message at least includes the above TNL address-CN and GTP-TEID-CN, a transport layer address of a GTP-U channel corresponding to the E-RAB on the small cell gateway (TNL address-SGW-CN) and a virtual connection identifier of the GTP-U channel (GTP-TEID-SGW-CN), and information about the E-RAB.

Figure 32:
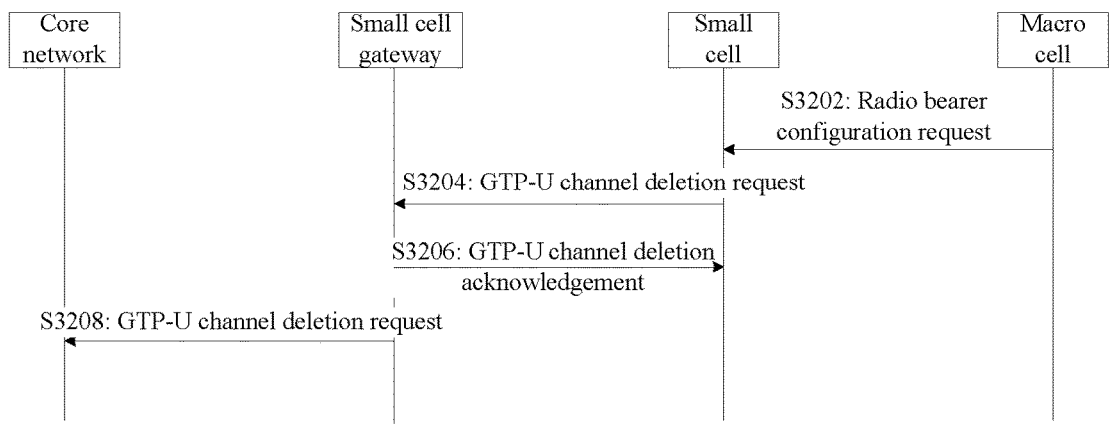
FIG. 32 is a flowchart showing deleting a GTP-U channel according to an embodiment of the disclosure.

Example embodiment III, the flow of deleting a GTP-U channel, FIG. 32 is a flowchart showing deleting a GTP-U channel according to an embodiment of the disclosure, as shown in FIG. 32, the process comprises the following steps.

Step S3202, the macro cell sends a radio bearer configuration request message to the small cell, and the radio bearer configuration request message at least includes information about the E-RAB corresponding to the GTP-U channel which needs to be deleted.

Step S3204, the small cell sends a GTP-U channel deletion request message to the small cell gateway, and the GTP-U channel deletion request message at least includes information about the E-RAB corresponding to the GTP-U channel which needs to be deleted. When there is no small cell gateway, this GTP-U channel deletion request message is directly sent to the core network, and the flow is ended.

Step S3206, the small cell gateway sends a GTP-U channel deletion acknowledgement message to the small cell, and the GTP-U channel deletion acknowledgement message at least includes information about the E-RAB corresponding to the GTP-U channel which needs to be deleted.

Step S3208, the small cell gateway sends a GTP-U channel requesting message to the core network, and the GTP-U channel requesting message at least includes information about the E-RAB corresponding to the GTP-U channel which needs to be deleted.

Figure 33:
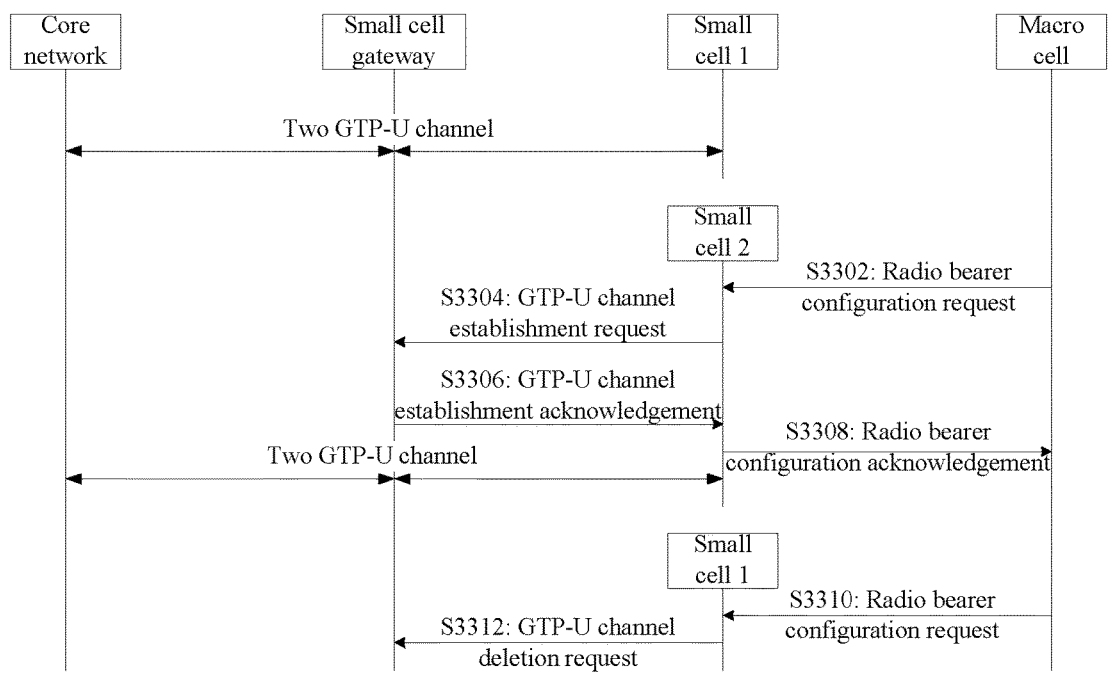
FIG. 33 is a flowchart of changing a GTP-U channel according to an embodiment of the disclosure.

Example embodiment IV, a flow of changing a GTP-U channel, FIG. 33 is a flowchart of changing a GTP-U channel according to an embodiment of the disclosure, as shown in FIG. 33, and the process comprises the following steps.

The existing condition is that a GTP-U channel has been established for a certain E-RAB between the core network and a small cell 1. This GTP-U channel comprises one GTP-U channel between a core network and a small cell gateway and the other GTP-U channel between the small cell gateway and the small cell 1. In the following flow, the management of the GTP-U channel will not influence the core network when the terminal moves among small cells, so that it is possible to introduce a large number of small cells at a wireless side.

Step S3302, the macro cell initiates a radio bearer configuration process to a small cell 2 when the terminal moves from the small cell 1 to the small cell 2. The radio bearer configuration request message at least includes information about the E-RAB.

Step S3304, the small cell 2 sends a GTP-U channel establishment request message to the small cell gateway, and the GTP-U channel establishment request message at least includes information about the E-RAB, a transport layer address of a GTP-U channel corresponding to the E-RAB on the small cell 2 (TNL address-SC2) and a virtual connection identifier of the GTP-U channel (GTP-TEID-SC2), and when there is no small cell gateway in the network structure, this GTP-U channel establishment request message is directly sent to the core network.

Step S3306, the small cell gateway sends a GTP-U channel establishment acknowledgement message, and the GTP-U channel establishment acknowledgement message at least includes a transport layer address of a GTP-U channel corresponding to the E-RAB on the small cell gateway (TNL address-SGW-SC2) and a virtual connection identifier of the GTP-U channel (GTP-TEID-SGW-SC2). The small cell gateway determines that there has been the GTP-U channel from the small cell gateway corresponding to the E-RAB to the core network according to the E-RAB information. Therefore, a management message related to the GTP-U channel is no longer sent to the core network, and when there is no small cell gateway in the network structure, the network sends a GTP-U channel establishment acknowledgement message.

Step S3308, the small cell 2 sends the radio bearer configuration acknowledgement message to the macro cell to acknowledgement that the GTP-U channel is successfully established.

Step S3310, the macro cell sends the radio bearer configuration request message to the small cell 1 to requires to delete the GTP-U channel from the small cell 1 to the core network, wherein the radio bearer configuration request message at least includes information about the E-RAB which is required to be deleted. The small cell 1 may forward the data packet related to the E-RAB to the macro cell.

Step S3312, the small cell 1 sends a GTP-U channel deletion request message to the small cell gateway, and the GTP-U channel deletion request message at least includes information about the E-RAB which is required to be deleted. Because the small cell gateway has established a GTP-U channel between the gateway and the small cell 2 for the E-RAB, this GTP-U channel deletion request message is no longer sent to the core network so as to shield the influence to the core network. When there is no small cell gateway in the network structure, the GTP-U channel deletion request message is directly sent to the core network.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A network access system, comprising:
a control plane node, connected with a User Equipment (UE) by a radio interface, connected with a Mobile Management Entity (MME) by an Si interface, and configured to process control plane data which is used for the UE to access to a network; and
a user plane node, connected with the UE by a radio interface, connected with a Serving Gateway (SGW) by an Ss interface, and configured to process user plane data which are used for the UE to access to the network; an
Xu interface, connected between the control plane node and the user plane node and configured to enable the control plane node to forward the control plane data to the UE by the user plane node.

2. The system according to claim 1, wherein the system further comprises:
a user plane gateway, connected with the user plane node by an Xg interface, connected with the SGW by an S3 interface, and configured to forward the user plane data.

3. The system according to claim 2, wherein the user plane gateway is further configured to execute at least one of the following processing:
establishing a signalling connection of an Xc interface between the control plane node and the user plane gateway; establishing a signalling connection of the Xg interface between the user plane node and the user plane gateway; executing operations for establishing, deleting and/or modifying a General Packet Radio Service (GPRS) Tunnelling Protocol-User Plane (GTP-U) channel between the user plane node and the user plane gateway; and controlling operations for establishing, deleting, and/or modifying a GTP-U channel between the user plane gateway and the SGW.

4. The system according to claim 2, wherein the system further comprises:
an Xc interface, connected between the control plane node and the user plane gateway, configured to enable the control plane node to control operations for establishing, deleting and/or modifying a channel between the user plane gateway and the SGW; and/or configured to enable the control plane node to control operations for establishing, deleting and/or modifying a channel between the user plane gateway and the user plane node.

5. The system according to claim 1, wherein the control plane node is further configured to execute at least one of the following processing:
establishing a signalling connection of an Xu interface between the control plane node and the user plane node; establishing a signalling connection of an Xc interface between the control plane node and the user plane gateway; controlling operations for establishing, deleting and/or modifying a General Packet Radio Service (GPRS) Tunnelling Protocol-User Plane (GTP-U) channel between the user plane node and the user plane gateway; controlling operations for establishing, deleting and/or modifying a GTP-U channel between the user plane gateway and the SGW; and controlling operations for establishing, deleting and/or modifying the radio interface between the user plane node and the UE.

6. The system according to claim 1, wherein the user plane node is further configured to execute at least one of the following processing:
establishing a signalling connection of an Xu interface between the control plane node and the user plane node; establishing a signalling connection of an Xg interface between the user plane node and a user plane gateway; when there is a user plane gateway, executing operations for establishing, deleting and/or modifying a General Packet Radio Service (GPRS) Tunnelling Protocol-User Plane (GTP-U) channel between the user plane node and the user plane gateway; when there is no user plane gateway, executing operations for establishing, deleting and/or modifying a General Packet Radio Service (GPRS) Tunnelling Protocol-User Plane (GTP-U) channel between the user plane node and the SGW; and forwarding the control plane data transmitted between the control plane node and the UE.

7. The system according to claim 1, wherein the system further comprises: a user plane gateway, connected with the user plane node by an Xg interface, connected with the SGW by an S3 interface, and configured to forward the user plane data.

8. A network access method, comprising:
establishing a control plane link for a control plane node to process control plane data which is used for a User Equipment (UE) to access to a network, wherein the control plane link comprises a connection between the control plane node and the UE by a radio interface and a connection between the control plane node and a Mobile Management Entity (MME) by an Si interface;
establishing one or more user plane links for one or more user plane nodes to process user plane data which are used for the UE to access to the network, wherein the one or more user plane links comprise one or more connections between the one or more user plane nodes and the UE by one or more radio interfaces and one or more connections between the one or more user plane nodes and a Serving Gateway (SGW) by one or more Ss interfaces;
processing the control plane data according to the control plane link; and
processing the user plane data according to the one or more user plane links,
wherein establishing the control plane link for the control plane node to process the control plane data which is used for the UE to access to the network comprises:
establishing one or more Xu interfaces between the control plane node connected with the MME and the one or more user plane nodes connected with the UE, wherein the one or more Xu interfaces are used to forward the control plane data.

9. The method according to claim 8, wherein when there are one or more user plane gateways for forwarding the user plane data between the SGW and the one or more user plane nodes connected with the UE, establishing the one or more user plane links for the one or more user plane nodes to process the user plane data which is used for the UE to access to the network comprises:
establishing one or more Xc interfaces between the control plane node and the one or more user plane gateways, wherein the one or more Xc interfaces are used for the control plane node to control to forward the user plane data by the one or more user plane gateways, and/or
establishing one or more Xg interfaces between the one or more user plane nodes and the one or more user plane gateways, wherein the one or more Xg interfaces are used for forwarding the user plane data.

10. The method according to claim 8, wherein processing the control plane data according to the control plane link comprises:
processing from the user plane node to the control plane node, which comprises at least one of the following: reporting a problem in a process of the UE conducting random access and reporting that the number of times of transmitting data by a Radio Link Control (RLC) reaches a threshold for the number of times; and
processing from the control plane node to the user plane node, which comprises at least one of the following: transferring data, parameter configuration, parameter reconfiguration, Medium Access Control (MAC) layer restoration, link establishment between a RLC and a Packet Data Convergence Layer (PDCP) entity, link release between the RLC and the PDCP entity, reestablishment between the RLC and the PDCP entity, verifying consistence protection and integrity algorithm, reporting a bottom layer synchronization state and reporting a cell deactivation state.

11. A network access system, comprising:
a first establishing component, configured to establish a control plane link for a control plane node to process control plane data which is used for a User Equipment (UE) to access to a network, wherein the control plane link comprises a connection between the control plane node and the UE by a radio interface and a connection between the control plane node and a Mobile Management Entity (MME) by an S1 interface;
a second establishing component, configured to establish one or more user plane links for one or more user plane nodes to process user plane data which is used for the UE to access to the network, wherein the one or more user plane links comprise one or more connections between the one or more user plane nodes and the UE by one or more radio interfaces and one or more connections between the one or more user plane nodes and a Serving Gateway (SGW) by one or more Ss interfaces; a first processing component, configured to process the control plane data according to the control plane link; and
a second processing component, configured to process the user plane data according to the one or more user plane links, wherein the first establishing component comprises:
a first establishing element, configured to establish one or more Xu interfaces between the control plane node connected with the MME and the one or more user plane nodes connected with the UE, wherein the one or more Xu interfaces are used to forward the control plane data.

12. A network access system, comprising:
a macro cell, connected with a User Equipment (UE) by a radio interface, connected with a core network by an Si interface, connected to one or more small cells by one or more Xx interfaces, and configured to process control plane data which are used for the UE to access to the Xx interface and the radio interface of the core network through the one or more small cells; and the one or more small cells, connected with the UE by a radio interface, connected with the core network by an S2 interface, connected with the macro cell by the Xx interface, and configured to process control plane data and user plane data which are used for the UE to access to the Xx interface and the S2 interface of the core network through the one or more small cells.

13. The system according to claim 12, wherein the system further comprises:

a small cell gateway, connected with the core network and the small cell by the S2 interface, and configured to control a General Packet Radio Service (GPRS) Tunnelling Protocol-User Plane (GTP-U) channel between the core network and the small cell.

14. A network access method, comprising:

establishing one or more control plane links used for processing control plane data which are used for a User Equipment (UE) to access to a core network through one or more small cells, wherein the one or more control plane links comprise a connection between a macro cell and the UE by a radio interface, one or more connections between the macro cell and the one or more small cells by one or more Xx interfaces, and one or more connections between the one or more small cells and the core network by one or more S2 interfaces;

establishing one or more user plane links used for processing user plane data which are used for the UE to access to the core network through the one or more small cells, wherein the one or more user plane links comprise one or more connections between the one or more small cells and the UE by one or more radio interfaces, one or more connections between the one or more small cells and the core network by one or more S2 interfaces, and one or more connections between the one or more small cells and the macro cell by one or more Xx interfaces;

processing the control plane data according to the one or more control plane links; and processing the user plane data according to the one or more user plane links.

15. The method according to claim 14, wherein establishing the one or more S2 interfaces between the one or more small cells and the core network, which are the one or more user plane links for processing user plane data which are used for the UE to access to the core network through the one or more small cells comprises:

establishing a General Packet Radio Service (GPRS) Tunnelling Protocol-User Plane (GTP-U) channel between the core network and a small cell gateway; and establishing one or more GTP-U channels between the small cell gateway and the one or more small cells.

16. The method according to claim 14, wherein processing the control plane data according to the one or more control plane links comprises at least one of the following:

establishing one or more signalling connections of Xx interfaces between the macro cell and the one or more small cells; controlling operations for establishing, deleting, and/or modifying General Packet Radio Service (GPRS) Tunnelling Protocol-User Plane (GTP-U) channels between the one or more small cells and the core network; establishing radio bearers between the UE and the one or more small cells; and processing IP data packet forwarding between the macro cell and the one or more small cells through one or more Xx interfaces.

17. The method according to claim 14, wherein processing the user plane data according to the one or more user plane links comprises:

maintaining a General Packet Radio Service (GPRS) Tunnelling Protocol-User Plane (GTP-U) channel between a small cell gateway and the core network; and processing the user plane data according to the maintained GTP-U channel.

18. A network access system, comprising:

a third establishing component, configured to establish one or more control plane links used for processing control plane data which are used for a User Equipment (UE) to access to a core network through one or more small cells, wherein the one or more control plane links comprise a connection between a macro cell and the UE by a radio interface, a connection between the macro cell and the core network by an S1 interface, one or more connections between the macro cell and the one or more small cells by one or more Xx interfaces, and one or more connections between the one or more small cells and the core network by one or more S2 interfaces;

a fourth establishing component, configured to establish one or more user plane links used for processing user plane data which are used for the UE to access to the core network through the one or more small cells, wherein the one or more user plane links comprise one or more connections between the one or more small cells and the UE by one or more radio interfaces, one or more connections between the one or more small cells and the core network by one or more S2 interfaces, and one or more connections between the one or more small cells and the macro cell by one or more Xx interfaces;

a third processing component, configured to process the control plane data according to the one or more control plane links; and a fourth processing component, configured to process the user plane data according to the one or more user plane links.

* * * * *